US012436580B2

(12) United States Patent
Liang

(10) Patent No.: US 12,436,580 B2
(45) Date of Patent: Oct. 7, 2025

(54) MEMORY SYSTEM, MEMORY RESOURCE ADJUSTMENT METHOD AND APPARATUS, AND ELECTRONIC DEVICE AND MEDIUM

(71) Applicant: SUZHOU METABRAIN INTELLIGENT TECHNOLOGY CO., LTD., Jiangsu (CN)

(72) Inventor: Kun Liang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/116,952

(22) PCT Filed: Dec. 26, 2023

(86) PCT No.: PCT/CN2023/142079
§ 371 (c)(1),
(2) Date: Mar. 28, 2025

(87) PCT Pub. No.: WO2024/230193
PCT Pub. Date: Nov. 14, 2024

(65) Prior Publication Data
US 2025/0258525 A1 Aug. 14, 2025

(30) Foreign Application Priority Data
May 6, 2023 (CN) .......................... 202310499307.X

(51) Int. Cl.
G06F 1/18 (2006.01)
G06F 9/50 (2006.01)
G06F 13/40 (2006.01)

(52) U.S. Cl.
CPC ............ G06F 1/185 (2013.01); G06F 9/5016 (2013.01); G06F 13/4022 (2013.01); G06F 13/409 (2013.01)

(58) Field of Classification Search
CPC .... G06F 1/185; G06F 9/5016; G06F 13/4022; G06F 13/409
See application file for complete search history.

(56) References Cited

U.S. PATENT DOCUMENTS 5,293,498 A * 3/1994 Iwatsubo ................ G06F 13/14
710/104
5,793,616 A * 8/1998 Aubuchon ........... H05K 7/1429
439/91

(Continued)

FOREIGN PATENT DOCUMENTS

CN 109684257 A 4/2019
CN 213545260 U 6/2021

(Continued)

Primary Examiner — Faisal M Zaman
(74) Attorney, Agent, or Firm — IPro, PLLC

(57) ABSTRACT

A memory system includes a first motherboard, and a processor and a high-speed interconnection channel interface that are integrated on the first motherboard; a first adapter board, and a high-speed interconnection channel interface, a chip and a memory module that are integrated on the first adapter board; and at least one connecting cable; the at least one connecting cable is used to establish a physical link between the high-speed interconnection channel interface of the first motherboard and the high-speed interconnection channel interface of the first adapter board, and used to convert the high-speed channel interconnection signal into a processor internal dedicated bus signal transmitted by a physical link based on a peripheral component interconnect express; and the chip of the first adapter board is used to acquire the converted processor internal dedicated bus signal, and convert the processor internal dedicated bus signal into a double data rate memory signal.

19 Claims, 14 Drawing Sheets

(56) References Cited

U.S. PATENT DOCUMENTS

| | | | | |
|---|---|---|---|---|
| 6,261,104 | B1* | 7/2001 | Leman | H01R 12/721 |
| | | | | 439/752 |
| 9,298,228 | B1* | 3/2016 | Abhyankar | G06F 1/185 |
| 9,583,918 | B1* | 2/2017 | Phan | G06F 1/189 |
| 10,346,340 | B1* | 7/2019 | Tseng | G06F 13/4081 |
| 11,334,130 | B1* | 5/2022 | Kennedy | G06F 1/30 |
| 11,604,745 | B1* | 3/2023 | Lambert | G06F 13/1689 |
| 2015/0347345 | A1* | 12/2015 | Hellriegel | G06F 13/409 |
| | | | | 710/301 |
| 2016/0070661 | A1* | 3/2016 | Huang | G06F 13/12 |
| | | | | 710/33 |
| 2016/0170928 | A1* | 6/2016 | Tamarkin | H05K 5/0286 |
| | | | | 710/313 |
| 2016/0328347 | A1* | 11/2016 | Worley | G06F 13/4022 |
| 2019/0045634 | A1* | 2/2019 | Hill | H05K 1/141 |
| 2019/0197005 | A1* | 6/2019 | Chen | G06F 13/4295 |
| 2019/0306005 | A1* | 10/2019 | Desai | G06F 13/1684 |
| 2022/0197848 | A1* | 6/2022 | Chou | G06F 13/409 |
| 2023/0038672 | A1* | 2/2023 | Wang | G06F 13/20 |
| 2023/0195658 | A1* | 6/2023 | Wu | G06F 13/1647 |
| | | | | 710/119 |

FOREIGN PATENT DOCUMENTS

| | | |
|---|---|---|
| CN | 115904714 A | 4/2023 |
| CN | 116225177 A | 6/2023 |

\* cited by examiner determining current load information of the memory system, and determining a target memory resource that needs to be provided according to the current load information — 1601 based on the target memory resource, determining whether to control the first motherboard and the first adapter board to connect, and/or, determining whether to control the second motherboard and the second adapter board to connect, and/or, determining a quantity of first adapter boards connected to the first motherboard, and/or, determining a quantity of second adapter boards connected to the second motherboard — 1602

FIG. 16

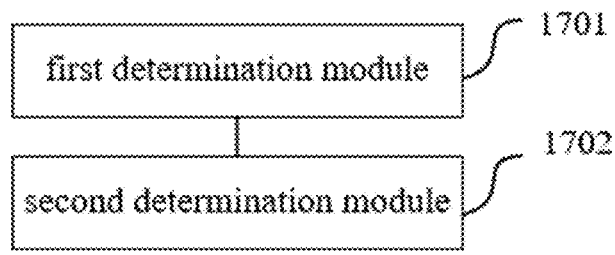

FIG. 17

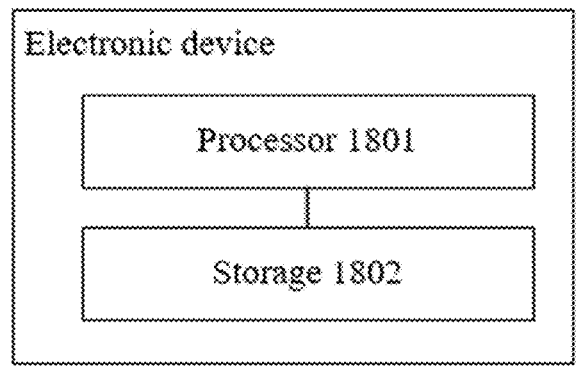

FIG. 18

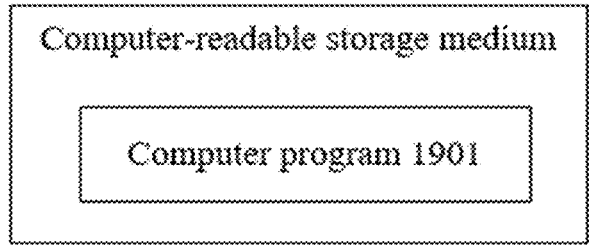

FIG. 19

MEMORY SYSTEM, MEMORY RESOURCE ADJUSTMENT METHOD AND APPARATUS, AND ELECTRONIC DEVICE AND MEDIUM

CROSS-REFERENCE TO RELATED APPLICATION

The present application claims the priority of the Chinese Patent application filed on May 6, 2023 before the CNIPA, China National Intellectual Property Administration with the application number of 202310499307.X, and the title of "MEMORY SYSTEM, MEMORY RESOURCE ADJUSTMENT METHOD AND APPARATUS, AND ELECTRONIC DEVICE AND MEDIUM", which is incorporated herein in its entirety by reference.

FIELD

The present application relates to the field of computers, in particular to a memory system, a method for adjusting memory resources, an apparatus for adjusting memory resources, an electronic device, and a non-transitory computer-readable storage medium.

BACKGROUND

Memory, also known as an internal storage, is used to temporarily store computational data in a processor and data exchanged with external storage such as hard disks. The memory is a bridge between the outside and the processor, and is an indispensable part of the entire computing unit. The memory is a buffer device between the CPU (Central Processing Unit) and the hard disk, and is a temporary storage (used to temporarily store data). When programs run, they are scheduled to run in the memory, and the data will be automatically released from the memory after the server or program is shut down.

With the development of cloud computing applications, informatization is gradually covering various fields of society. People's daily work and life are increasingly communicating through the internet, and the amount of online data is also constantly increasing. The memory of the server is also facing many challenges, often encountering situations where the memory resources configured by the server are insufficient.

SUMMARY

In view of the above problems, embodiments of the present application provide a memory system, a method for adjusting memory resources, an apparatus for adjusting memory resources, an electronic device, and a non-transitory computer-readable storage medium that overcome or at least partially solve the above problems.

An embodiment of the present application discloses a memory system, including:
a first motherboard, and a processor and a high-speed interconnection channel interface that are integrated on the first motherboard;
a first adapter board, and a high-speed interconnection channel interface, a chip and a memory module that are integrated on the first adapter board; and
at least one connecting cable;
wherein the at least one connecting cable is used to establish a physical link between the high-speed interconnection channel interface of the first motherboard and the high-speed interconnection channel interface of the first adapter board, to establish a communication connection between the first motherboard and the first adapter board; wherein a connection between the high-speed interconnection channel interface of the first motherboard and the high-speed interconnection channel interface of the first adapter board is used to transmit a high-speed channel interconnection signal;
the at least one connecting cable is further used to convert the high-speed channel interconnection signal into a processor internal dedicated bus signal transmitted by a physical link based on a peripheral component interconnect express; and
the chip of the first adapter board is used to acquire the converted processor internal dedicated bus signal, and convert the processor internal dedicated bus signal into a double data rate memory signal, to enable a memory resource of the memory module of the first adapter board to be accessed and used by the processor of the first motherboard, to achieve memory pooling.

In some embodiments, further including:
a second motherboard, and a processor and a high-speed interconnection channel interface that are integrated on the second motherboard;
wherein the at least one connecting cable is further used to establish a physical link between the high-speed interconnection channel interface of the first motherboard and the high-speed interconnection channel interface of the second motherboard, to establish a communication connection between the first motherboard and the second motherboard.

In some embodiments, the at least one connecting cable includes a first connecting cable and a second connecting cable, and the memory system further includes:
the first connecting cable, used to transmit data between the processor of the first motherboard and the processor of the second motherboard; and
the second connecting cable, used to transmit a logic control signal between the first motherboard and the second motherboard.

In some embodiments, further including:
a miscellaneous signal transmission interface integrated on the first motherboard; and
a miscellaneous signal transmission interface integrated on the first adapter board;
wherein the at least one connecting cable is further used to establish a physical link between the miscellaneous signal transmission interface of the first motherboard and the miscellaneous signal transmission interface of the first adapter board; wherein a connection between the miscellaneous signal transmission interface of the first motherboard and the miscellaneous signal transmission interface of the first adapter board is used to transmit a miscellaneous signal.

In some embodiments, the miscellaneous signal includes a clock signal, and the memory system further includes:
the chip of the first adapter board, further used to acquire the clock signal.

In some embodiments, the miscellaneous signal includes a chip enable signal, and the memory system further includes:
a field programmable logic gate array module integrated on the first motherboard;
wherein the field programmable logic gate array module of the first motherboard is used to issue the chip enable signal; and
the chip of the first adapter board is further used to start working after acquiring the chip enable signal, and convert the processor internal dedicated bus signal into the double data rate memory signal.

In some embodiments, the miscellaneous signal includes a power-on completion signal, and the memory system further includes:
the memory module of the first adapter board, used to issue a power-on completion signal after power-on is completed, and transmit the power-on completion signal to the field programmable logic gate array module of the first motherboard, and further used to perform in-situ detection after acquiring the double data rate memory signal, and generate a corresponding detection signal.

In some embodiments, the miscellaneous signal includes a detection signal, and the memory system further includes:
a baseboard management controller module integrated on the first motherboard;
wherein the baseboard management controller module of the first motherboard is used to acquire the detection signal, determine a system working status based on the detection signal, and initialize the chip of the first adapter board when it is determined that the system working status is normal.

In some embodiments, the miscellaneous signal includes a reset signal, and the memory system further includes:
the field programmable logic gate array module of the first motherboard, further used to issue a reset signal when initializing the chip of the first adapter board; and
the memory module of the first adapter board, further used to provide a corresponding memory resource to the processor of the first motherboard for access and use after acquiring the reset signal.

In some embodiments, further including:
a second adapter board, and a high-speed interconnection channel interface, a miscellaneous signal transmission interface, a chip and a memory module that are integrated on the second adapter board;
wherein the at least one connecting cable is further used to establish a physical link between the high-speed interconnection channel interface of the second motherboard and the high-speed interconnection channel interface of the second adapter board, and establish a physical link between the miscellaneous signal transmission interface of the second motherboard and the miscellaneous signal transmission interface of the second adapter board, to establish a communication connection between the second motherboard and the second adapter board; wherein a connection between the high-speed interconnection channel interface of the second motherboard and the high-speed interconnection channel interface of the second adapter board is used to transmit the high-speed channel interconnection signal;
the at least one connecting cable is further used to convert the high-speed channel interconnection signal into a processor internal dedicated bus signal transmitted by the physical link based on the peripheral component interconnect express; and
the chip of the second adapter board is used to acquire the converted processor internal dedicated bus signal, and convert the processor internal dedicated bus signal into the double data rate memory signal, to enable a memory resource of the memory module of the second adapter board to be accessed and used by the processor of the second motherboard.

In some embodiments, the first motherboard is communicatively connected to a plurality of first adapter boards; the second motherboard is communicatively connected to a plurality of second adapter boards.

In some embodiments, the memory module of the first adapter board is a first memory module or a second memory module; the memory module of the second adapter board is the first memory module or the second memory module.

In some embodiments, the first motherboard is integrated with a plurality of processors, and the plurality of processors are interconnected to transfer the processor internal dedicated bus signal between each other, and the first motherboard is communicatively connected to a plurality of first adapter boards, and the memory system further includes:
the plurality of processors of the first motherboard, used to invoke memory resources of memory modules of the plurality of first adapter boards.

An embodiment of the present application further discloses a method for adjusting memory resources, applied to the memory system, wherein the memory system includes the first motherboard, the first adapter board, a second motherboard and a second adapter board, and the method includes:
determining current load information of the memory system, and determining a target memory resource that needs to be provided according to the current load information; and
based on the target memory resource, determining whether to control the first motherboard and the first adapter board to connect, and/or, determining whether to control the second motherboard and the second adapter board to connect, and/or, determining a quantity of first adapter boards connected to the first motherboard, and/or, determining a quantity of second adapter boards connected to the second motherboard.

In some embodiments, the step of, based on the target memory resource, determining whether to control the first motherboard and the first adapter board to connect, and/or, determining whether to control the second motherboard and the second adapter board to connect, and/or, determining a quantity of first adapter boards connected to the first motherboard, and/or, determining a quantity of second adapter boards connected to the second motherboard, includes:
in response to the target memory resource not exceeding memory resources provided by the first motherboard and the second motherboard, controlling the first motherboard and the first adapter board not to connect, and controlling the second motherboard and the second adapter board not to connect, so that only the first motherboard and the second motherboard are responsible for providing the memory resources.

In some embodiments, the step of, based on the target memory resource, determining whether to control the first motherboard and the first adapter board to connect, and/or, determining whether to control the second motherboard and the second adapter board to connect, and/or, determining a quantity of first adapter boards connected to the first motherboard, and/or, determining a quantity of second adapter boards connected to the second motherboard, includes:
in response to the target memory resource exceeding memory resources provided by the first motherboard and the second motherboard, and not exceeding a preset first memory resource usage threshold, controlling the first motherboard and the first adapter board to connect, and controlling the second motherboard and the second adapter board not to connect, so that the first motherboard, the second motherboard, and at least one first adapter board are responsible for providing the memory resources.

In some embodiments, the step of, based on the target memory resource, determining whether to control the first motherboard and the first adapter board to connect, and/or, determining whether to control the second motherboard and the second adapter board to connect, and/or, determining a quantity of first adapter boards connected to the first motherboard, and/or, determining a quantity of second adapter boards connected to the second motherboard, includes:

in response to the target memory resource exceeding a preset first memory resource usage threshold, and not exceeding a preset second memory resource usage threshold, controlling the first motherboard and the first adapter board to connect, and controlling the second motherboard and the second adapter board to connect, so that the first motherboard, the second motherboard, at least one first adapter board and at least one second adapter board are responsible for providing the memory resources.

In some embodiments, the method further includes:

in response to the target memory resource exceeding a preset second memory resource usage threshold, configuring the memory module of the first adapter board and/or a memory module of the second adapter board as a second memory module.

An embodiment of the present application further discloses an apparatus for adjusting memory resources, applied to the memory system, wherein the memory system includes the first motherboard, the first adapter board, a second motherboard and a second adapter board, and the apparatus includes:

a first determination module configured for determining current load information of the memory system, and determining a target memory resource that needs to be provided according to the current load information; and a second determination module configured for, based on the target memory resource, determining whether to control the first motherboard and the first adapter board to connect, and/or, determining whether to control the second motherboard and the second adapter board to connect, and/or, determining a quantity of first adapter boards connected to the first motherboard, and/or, determining a quantity of second adapter boards connected to the second motherboard.

In some embodiments, the second determination module includes:

a first control submodule configured for, in response to the target memory resource not exceeding memory resources provided by the first motherboard and the second motherboard, controlling the first motherboard and the first adapter board not to connect, and controlling the second motherboard and the second adapter board not to connect, so that only the first motherboard and the second motherboard are responsible for providing the memory resources.

In some embodiments, the second determination module includes:

a second control submodule configured for, in response to the target memory resource exceeding memory resources provided by the first motherboard and the second motherboard, and not exceeding a preset first memory resource usage threshold, controlling the first motherboard and the first adapter board to connect, and controlling the second motherboard and the second adapter board not to connect, so that the first motherboard, the second motherboard, and at least one first adapter board are responsible for providing the memory resources.

In some embodiments, the second determination module includes:

a third control submodule configured for, in response to the target memory resource exceeding a preset first memory resource usage threshold, and not exceeding a preset second memory resource usage threshold, controlling the first motherboard and the first adapter board to connect, and controlling the second motherboard and the second adapter board to connect, so that the first motherboard, the second motherboard, at least one first adapter board and at least one second adapter board are responsible for providing the memory resources.

In some embodiments, the apparatus further includes:

a configuration module configured for, in response to the target memory resource exceeding a preset second memory resource usage threshold, configuring the memory module of the first adapter board and/or a memory module of the second adapter board as a second memory module.

The embodiments of the present application include the following advantages:

In the embodiments of the present application, the memory system includes a first motherboard, and a processor and a high-speed interconnection channel interface that are integrated on the first motherboard; as well as a first adapter board, and a high-speed interconnection channel interface, a chip and a memory module that are integrated on the first adapter board. The connecting cable may establish a communication connection between the first motherboard and the first adapter board, and the connecting cable may convert the high-speed channel interconnect signal into a processor internal dedicated bus signal transmitted by a physical link based on a peripheral component interconnect express. Then, the chip of the first adapter board may convert the processor internal dedicated bus signal into a double data rate memory signal, to enable a memory resource of the memory module of the first adapter board to be accessed and used by the processor of the first motherboard. By adopting the above design, the high-speed channel interconnection signal is converted into an IPB (Inter-processor Bus) resource that may be transmitted over a PCIE (peripheral component interconnect express) physical link by the connecting cable, and the IPB resources are converted into DIMM (Dual-Inline-Memory-Modules) memory resources that comply with JEDEC (Joint Electron Device Engineering Council) protocol standards through chips that support a CXL protocol. Using external boards to expand DRAM (Dynamic Random Access Memory) resources, so that the DIMM resources are not on the same motherboard as the CPU, which may optimize the spatial layout resources of the motherboard.

BRIEF DESCRIPTION OF THE DRAWINGS

FIG. 16 is a flow chart of steps of a method for adjusting memory resources according to an embodiment of the present application;

FIG. 17 is a structural block diagram of an apparatus for adjusting memory resources according to an embodiment of the present application;

FIG. 18 is a structural block diagram of an electronic device according to an embodiment of the present application; and FIG. 19 is a structural block diagram of a non-transitory computer-readable storage medium according to an embodiment of the present application.

DETAILED DESCRIPTION

In order to make the above objectives, features, and advantages of the present application more obvious and understandable, the following will provide further detailed explanations of the present application in conjunction with the accompanying drawings and specific embodiments. Obviously, the embodiments described are only a part of the embodiments of the present application, not all of them. Based on the embodiments described in the present application, all other embodiments obtained by those skilled in the art are within the scope of protection of the present application.

In related art, the link directly from the processor to the memory is currently using DDR5 (DDR5 SDRAM, a computer memory specification). When there is not enough memory in the memory pool, DDR5 may be configured from 1DPC (DIMM PER CHANNEL) to 2DPC or even 3DPC, or a DDR5 memory module with a larger memory capacity may be configured. Alternatively, when the memory cannot be further expanded, it is prioritized for exchanging data in the server to release more memory space for use, so many manufacturers have added CPU interconnection channels and channels that may directly connect to DDR5 in the next generation of CPU.

Figure 1:
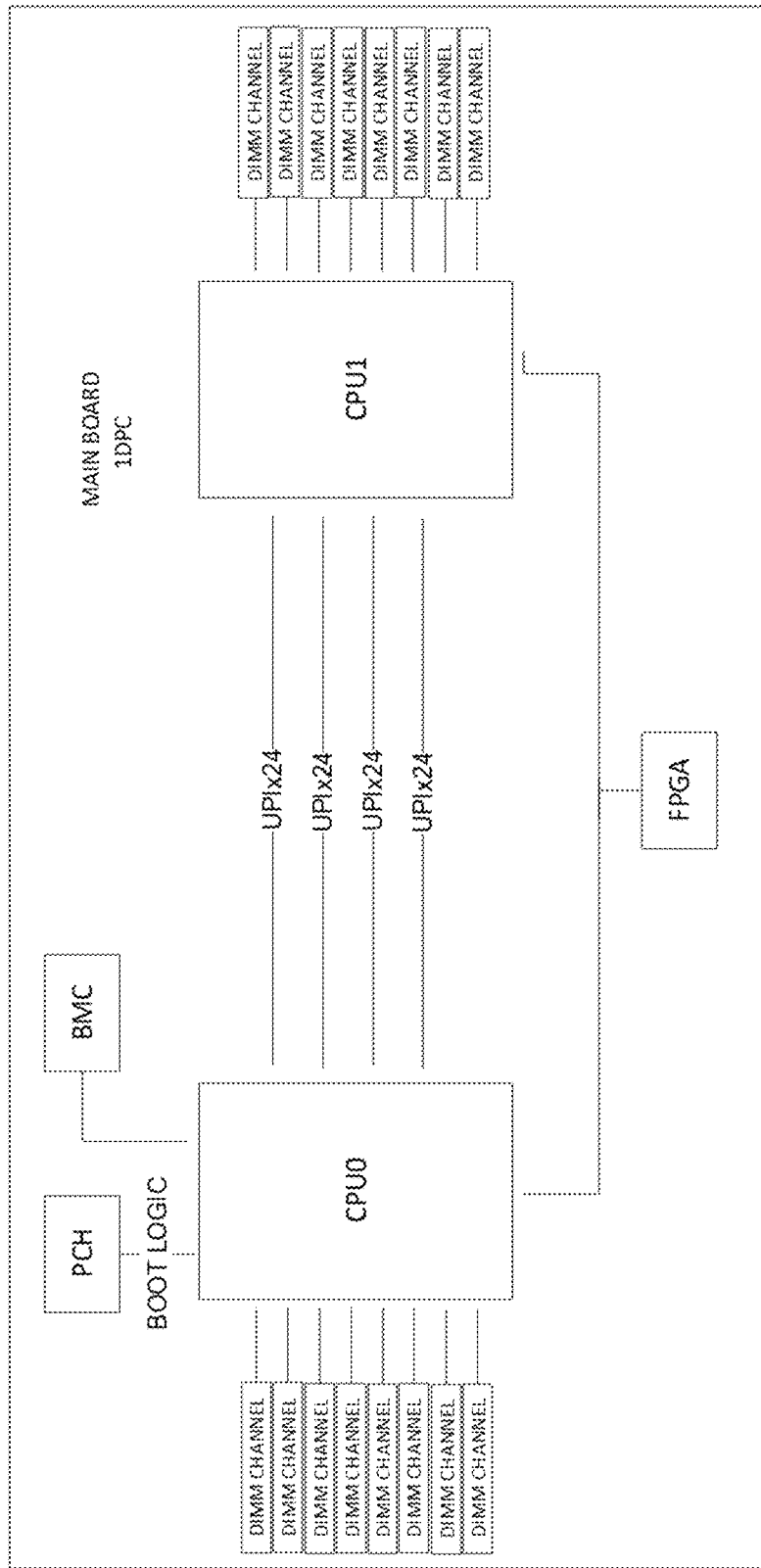
FIG. 1 is a system architecture diagram of a memory system.

As shown in FIG. 1, it is a system architecture diagram of a memory system. Each CPU supports 8DIMM (Dual-Inline-Memory-Modules) CHANNEL, and the UPI (Ultra Path Interconnect) for interconnecting two CPUs is 4×24. Based on the maximum configuration (256 GB) of the current DDR5, the maximum capacity of memory pools of a dual-processor server (1DPC) is calculated as 4096 GB (4 T). The memory system composed of the dual-processor server also includes FPGA (Field Programmable Gate Array) module, PCH (Platform Controller Hub, Integrated Southbridge) module, BOOT LOGIC (server startup logic, representing the sequence in which logical control signals occur), and BMC (Baseboard Manager Controller) module. The FPGA module is a digital integrated circuit that modifies and configures the internal connection structure and logic units of the device through software means to complete the predetermined design functions. The basic principle of FPGA is to integrate a large number of digital circuit basic gate circuits, storages, and interconnect resources into the chip. Users may define the functions of these gate circuits and the connections between modules by programming FPGA. The BMC (Baseboard Management Controller) module is a specialized service processor that uses sensors to monitor the status of a computer, a network server, or other hardware driven devices.

Figure 2:
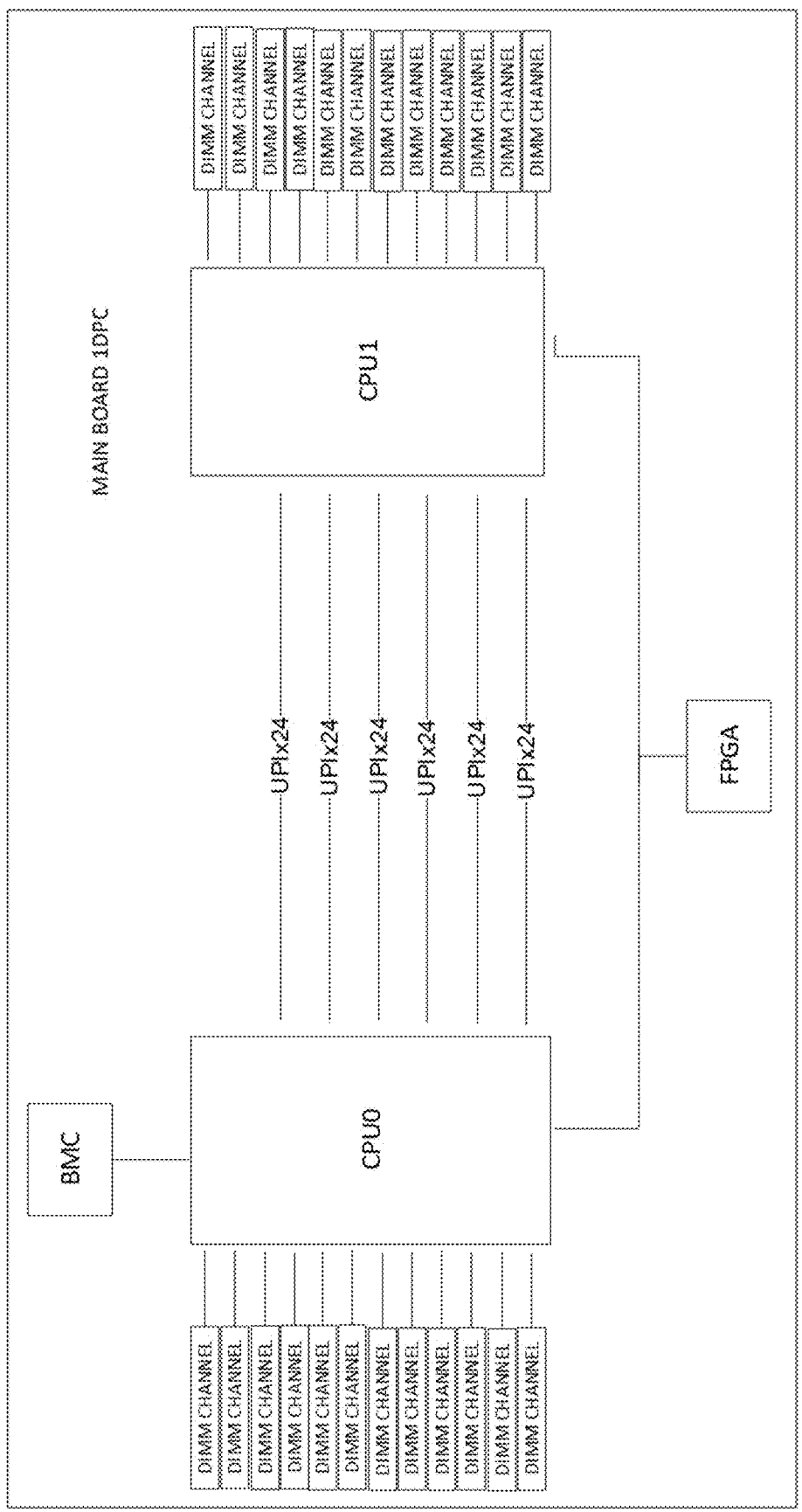
FIG. 2 is a system architecture diagram of another memory system.

As shown in FIG. 2, it is a system architecture diagram of another memory system. Each CPU supports 12DIMM CHANNEL, and the UPI for interconnecting two CPUs is 6×24. Based on the maximum configuration (256 GB) of the current DDR5, the maximum capacity of the memory pools of the dual-processor server (1DPC) is calculated as 6144 GB (6 T). The memory system composed of the dual-processor server also includes the FPGA module and the BMC module.

Figure 3:
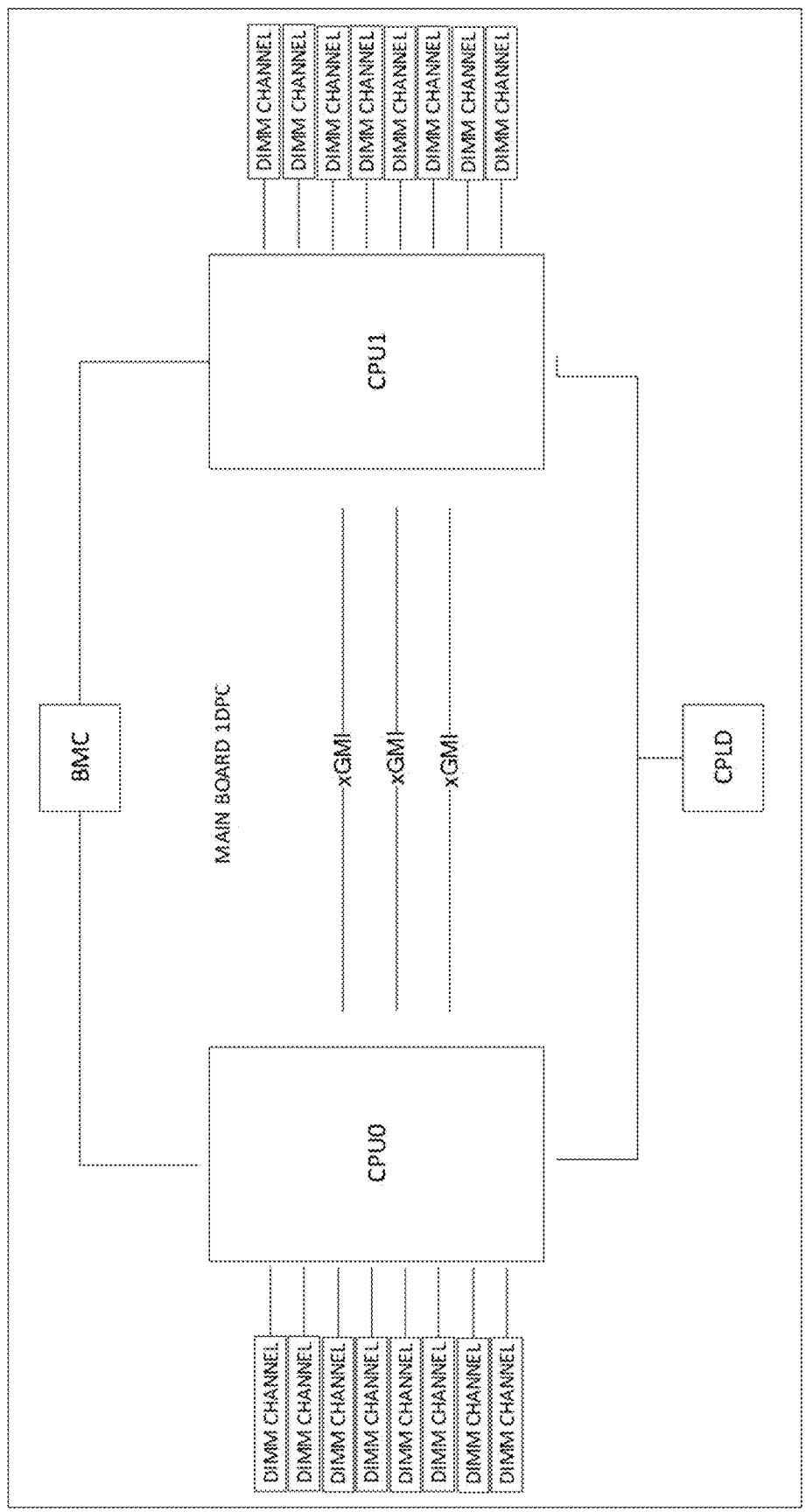
FIG. 3 is a system architecture diagram of yet another memory system.

As shown in FIG. 3, it is a system architecture diagram of yet another memory system. Each CPU may accommodate 8 DIMMs, and two CPUs are interconnected using 3 xGMIs (Global Memory Interconnect, memory interconnect interfaces in the processor). Based on the maximum configuration (256 GB) of the current DDR5, the maximum capacity of the memory pools of the dual-processor server (1DPC) is calculated as 4096 GB (4 T). The memory system composed of the dual-processor server also includes a CPLD (Complex Programmable Logic Device) module and the BMC module.

Figure 4:
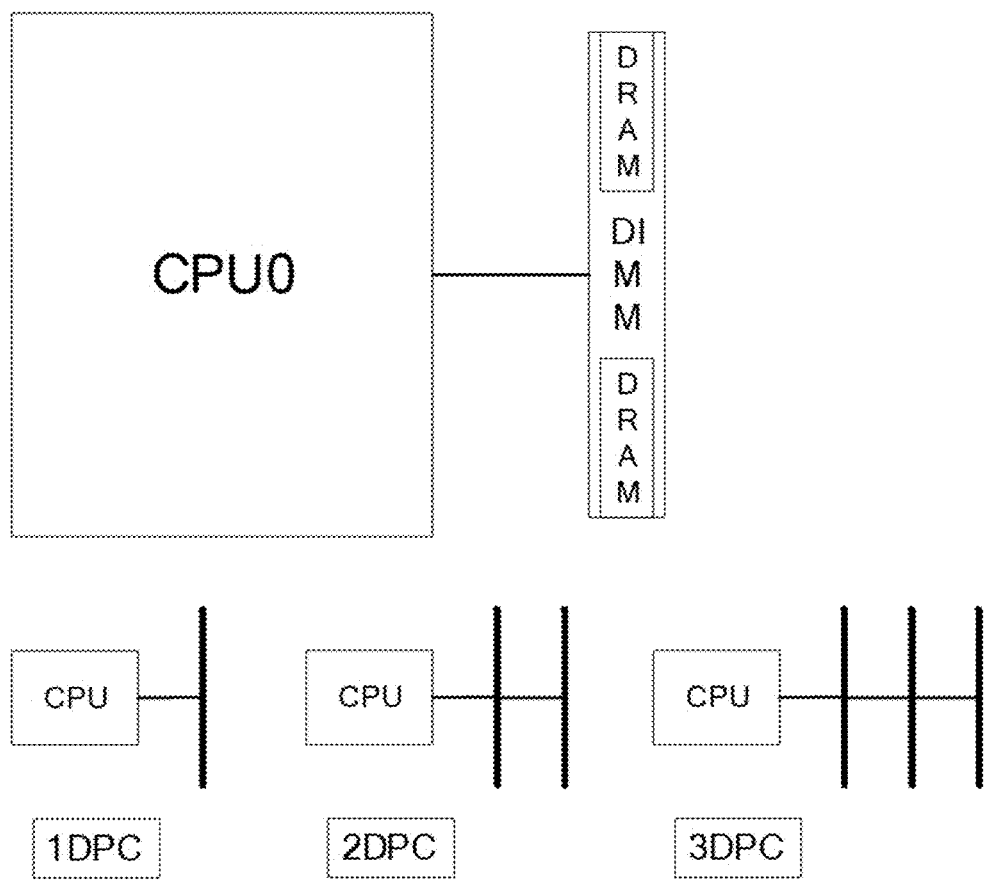
FIG. 4 is a schematic diagram of an insertion method of memory modules in a memory system.

As shown in FIG. 4, it is a schematic diagram of an insertion method of the memory modules in the memory system. DDR5 supports inserting two to three DIMMs into each channel, but this may result in other unfavorable factors. DRAM (Dynamic Random Access Memory) in the figure typically uses a transistor and a capacitor to represent one bit. The two main types of random-access memory (dynamic and static) both lose stored data after power is cut off.

For the memory systems in FIG. 1 and FIG. 2, when it needs to increase the memory, it is required to add more memory channels. However, this will eventually reach the maximum value that may be increased and cannot be further optimized. In addition, the smaller the processor process, the more chips may be integrated per unit area, which is not easy to meet the heat dissipation requirements.

For the memory system shown in FIG. 3, it is difficult to deploy and meet the current server chassis requirements. The design difficulty of layout and wiring of the circuit board is too high, 2DPC is feasible, while 3DPC is too low in feasibility. When from 1DPC to 2DPC, the operating rate of DDR (Double Data Rate SDRAM) will decrease from 4800-5600 mt/s of 1DPC to 4400 mt/s, and the transmission delay will increase by several tens of nanoseconds, which is not advisable for commercial users such as cloud users.

With the development of cloud computing applications, informatization is gradually covering various fields of society. Data center servers often face situations of insufficient memory resources.

DRAM accounts for a significant cost in every data center. But servers are not homogeneous, workloads are dynamic, and they are constantly changing and improving. The combination of computing resources, DRAM, NAND (NAND flash memory), and network types will vary depending on the workloads. Cloud providers perform various configurations and attempt to optimize hardware products for different workloads through these configurations. In response to such situations, the CXL (Compute Express Link) protocol has been proposed. CXL is an industry supported cache coherence interconnect protocol for processors, memory expansion, and accelerators. CXL technology maintains consistency between the CPU memory space and the memory on additional devices, which allows resource sharing for higher performance, reduces software stack complexity, and lowers overall system costs. This allows users to simply focus on the target workload, rather than the redundant memory management hardware in the accelerator.

In order to solve the above problems, the present application intends to provide a memory system that overcomes or at least partially solves the above problems. Through the CXL technology, multiple servers may share a portion of the memory and dynamically allocate it to different servers. Instead of excessively configuring the servers, it is better to configure them closer to a ratio of the average DRAM to the kernel, and to address excessive DRAM needs of the customers through the memory pool. This memory pool will communicate through the CXL protocol.

One of the core concepts of the embodiment of the present application is that, the memory system includes a first motherboard, and a processor and a high-speed interconnection channel interface that are integrated on the first motherboard; as well as a first adapter board, and a high-speed interconnection channel interface, a chip and a memory module that are integrated on the first adapter board. The connecting cable may establish a communication connection between the first motherboard and the first adapter board, and the connecting cable may convert the high-speed channel interconnect signal into a processor internal dedicated bus signal transmitted by a physical link based on a peripheral component interconnect express. Then, the chip of the first adapter board may convert the processor internal dedicated bus signal into a double data rate memory signal, to enable a memory resource of the memory module of the first adapter board to be accessed and used by the processor of the first motherboard. By adopting the above design, the high-speed channel interconnection signal is converted into an IPB (Inter-processor Bus) resource that may be transmitted over a PCIE (peripheral component interconnect express) physical link by the connecting cable, and the IPB resources are converted into DIMM (Dual-Inline-Memory-Modules) memory resources that comply with JEDEC (Joint Electron Device Engineering Council) protocol standards through chips that support the CXL protocol. Using external boards to expand DRAM (Dynamic Random Access Memory) resources, so that the DIMM resources are not on the same motherboard as the CPU, which may optimize the spatial layout resources of the motherboard.

Figure 5:
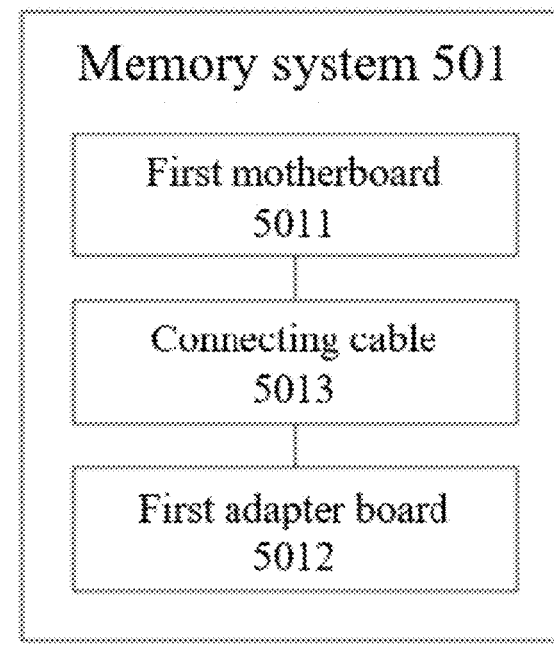
FIG. 5 is a structural block diagram of a memory system according to an embodiment of the present application.

Referring to FIG. 5, it shows a structural block diagram of a memory system according to an embodiment of the present application. The memory system 501 includes:

a first motherboard 5011, and a processor and a high-speed interconnection channel interface that are integrated on the first motherboard 5011;

a first adapter board 5012, and a high-speed interconnection channel interface, a chip and a memory module that are integrated on the first adapter board 5012; and at least one connecting cable 5013;

wherein the at least one connecting cable 5013 is used to establish a physical link between the high-speed interconnection channel interface of the first motherboard 5011 and the high-speed interconnection channel interface of the first adapter board 5012, to establish a communication connection between the first motherboard 5011 and the first adapter board 5012; wherein a connection between the high-speed interconnection channel interface of the first motherboard 5011 and the high-speed interconnection channel interface of the first adapter board 5012 is used to transmit a high-speed channel interconnection signal;

the at least one connecting cable 5013 is further used to convert the high-speed channel interconnection signal into a processor internal dedicated bus signal transmitted by a physical link based on a peripheral component interconnect express; and the chip of the first adapter board 5012 is used to acquire the converted processor internal dedicated bus signal, and convert the processor internal dedicated bus signal into a double data rate memory signal, to enable a memory resource of the memory module of the first adapter board 5012 to be accessed and used by the processor of the first motherboard 5011.

Specifically, the high-speed interconnection channel interface may be a UPI interface or an IPB interface, the connecting cable may be Cable cables, the physical link based on the peripheral component interconnect express is a PCIE physical link, the processor internal dedicated bus signal is an IPB signal, and the double data rate memory signal is a DDR signal.

Multiple servers may share a portion of memory and dynamically allocate it to different servers. Instead of excessively configuring the servers, it may configure them closer to a ratio of the average DRAM to the kernel, and to address excessive DRAM needs of the customers through the memory pool. This memory pool will communicate through the CXL protocol.

IPB (Inter-processor Bus (Intel UPI, AMD xGMI, etc.) is a protocol wiring for interconnecting CPUs inside the servers. Taking UPI of Intel as an example, UPI is essentially a dedicated high-speed transmission protocol that belongs to the IPB resources. Compared with the information transmission of ordinary PCIE, it lacks management signals and clock signals. UPI may be converted into IPB signals transmitted by the physical link based on PCIE (peripheral component interconnect express, high-speed serial computer expansion bus standard) by adding capacitors to the TX end of the Cable. Then, according to the CXL protocol, the IPB signals that pass through the PCIE physical link may be converted into standard DDR signals through a dedicated conversion chip. Therefore, UPI may be expanded to more memory to pool the entire memory. The above-mentioned high-speed channel interconnection signal may be a UPI signal.

Figure 6:
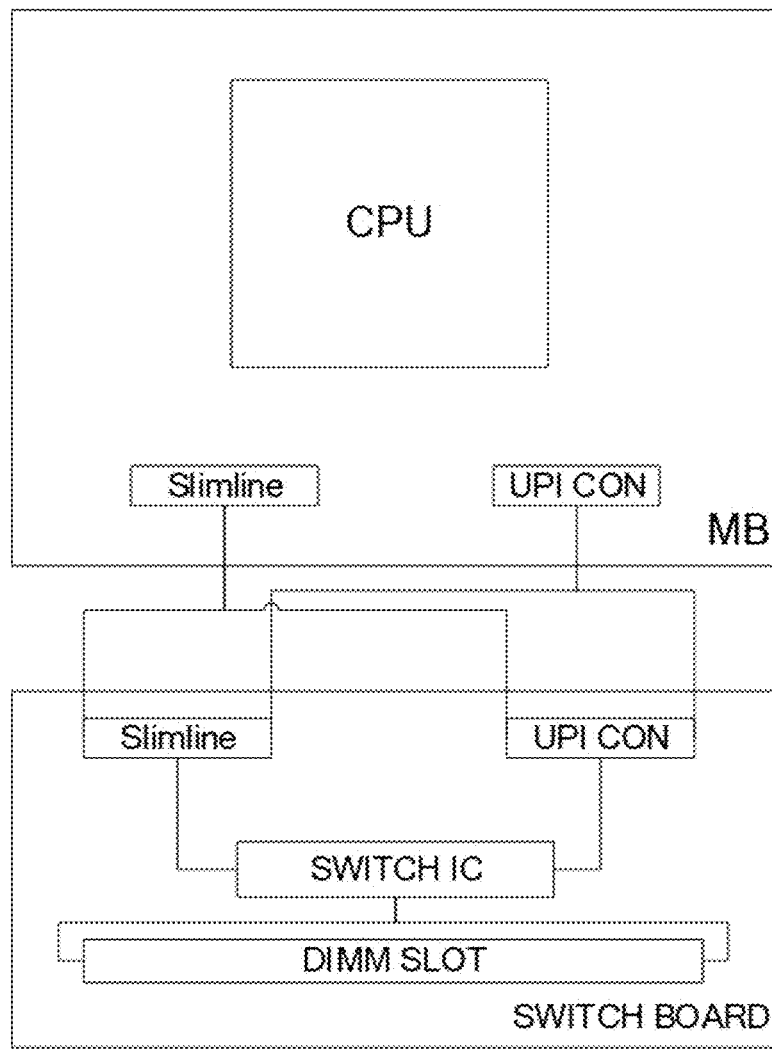
FIG. 6 is a system architecture diagram of a memory system according to an embodiment of the present application.

In the memory system of the embodiment of the present application, the memory resources on the first adapter board may be provided to the first motherboard for use through signal conversion. As shown in FIG. 6, it is a system architecture diagram of a memory system according to an embodiment of the present application. On the motherboard (MB), the UPI signals are transmitted to UPI CON (high-speed interconnection channel interface), other miscellaneous signals (including SMB, PRSNT, 100M_CLKDP\DN, etc.) are transmitted to the miscellaneous signal transmission interface (Slimline interface), and all signals are transmitted to SWITCH BOARD (adapter board) through the Cable cables, and to SWITCH IC (chip) through on-board wirings. After conversion, the corresponding signals are transmitted to the corresponding DIMM SLOT (memory module).

In summary, in the embodiments of the present application, the memory system includes a first motherboard, and a processor and a high-speed interconnection channel interface that are integrated on the first motherboard; as well as a first adapter board, and a high-speed interconnection channel interface, a chip and a memory module that are integrated on the first adapter board. The connecting cable may establish a communication connection between the first motherboard and the first adapter board, and the connecting cable may convert the high-speed channel interconnect signal into a processor internal dedicated bus signal transmitted by a physical link based on a peripheral component interconnect express. Then, the chip of the first adapter board may convert the processor internal dedicated bus signal into a double data rate memory signal, to enable a memory resource of the memory module of the first adapter board to be accessed and used by the processor of the first motherboard. By adopting the above design, the high-speed channel interconnection signal is converted into the IPB resource that may be transmitted over the PCIE physical link by the connecting cable, and the IPB resources are converted into the DIMM memory resources that comply with JEDEC protocol standards through chips that support the CXL protocol. Using the external boards to expand DRAM resources, so that the DIMM resources are not on the same motherboard as the CPU, which may optimize the spatial layout resources of the motherboard.

Figure 7:
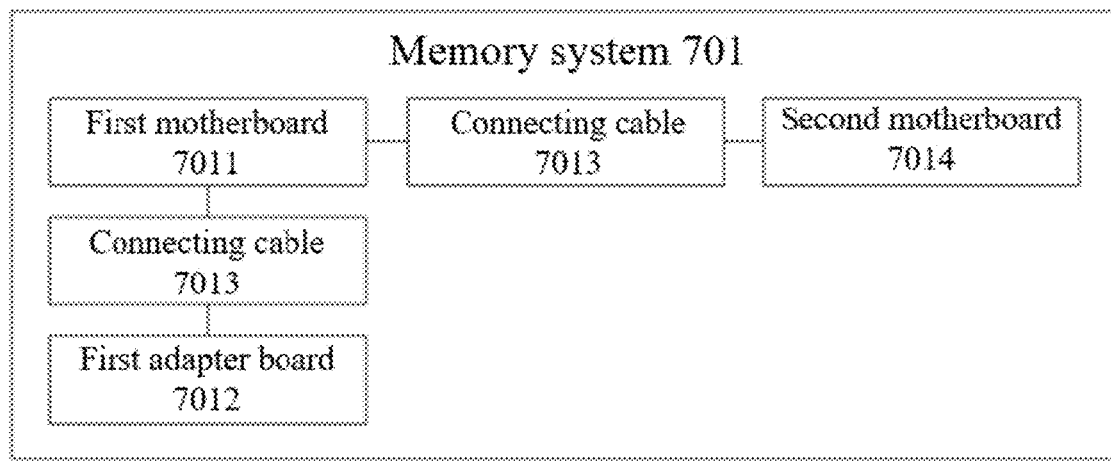
FIG. 7 is a structural block diagram of another memory system according to an embodiment of the present application.

Referring to FIG. 7, it shows a structural block diagram of another memory system according to an embodiment of the present application. The memory system 701 includes:
- a first motherboard 7011, and a processor and a high-speed interconnection channel interface that are integrated on the first motherboard 7011;
- a first adapter board 7012, and a high-speed interconnection channel interface, a chip and a memory module that are integrated on the first adapter board 7012; and
- at least one connecting cable 7013;
- wherein the at least one connecting cable 7013 is used to establish a physical link between the high-speed interconnection channel interface of the first motherboard 7011 and the high-speed interconnection channel interface of the first adapter board 7012, to establish a communication connection between the first motherboard 7011 and the first adapter board 7012; wherein a connection between the high-speed interconnection channel interface of the first motherboard 7011 and the high-speed interconnection channel interface of the first adapter board 7012 is used to transmit a high-speed channel interconnection signal;
- the at least one connecting cable 7013 is further used to convert the high-speed channel interconnection signal into a processor internal dedicated bus signal transmitted by a physical link based on a peripheral component interconnect express; and
- the chip of the first adapter board 7012 is used to acquire the converted processor internal dedicated bus signal, and convert the processor internal dedicated bus signal into a double data rate memory signal, to enable a memory resource of the memory module of the first adapter board 7012 to be accessed and used by the processor of the first motherboard 7011;
- a second motherboard 7014, and a processor and a high-speed interconnection channel interface that are integrated on the second motherboard 7014;
- wherein the at least one connecting cable 7013 is further used to establish a physical link between the high-speed interconnection channel interface of the first motherboard 7011 and the high-speed interconnection channel interface of the second motherboard 7014, to establish a communication connection between the first motherboard 7011 and the second motherboard 7014.

In the memory system of the embodiment of the present application, the two motherboards may belong to different servers. The entire dual-processor server is converted into two single-processor servers through Cable interconnection, so that the important IPB resources in the system are no longer traditional dedicated resources and may be connected to other places through cables for more effective use.

In one embodiment of the present application, the at least one connecting cable includes a first connecting cable and a second connecting cable, and the memory system 701 further includes:
- the first connecting cable, used to transmit data between the processor of the first motherboard and the processor of the second motherboard; and
- the second connecting cable, used to transmit a logic control signal between the first motherboard and the second motherboard.

Figure 8:
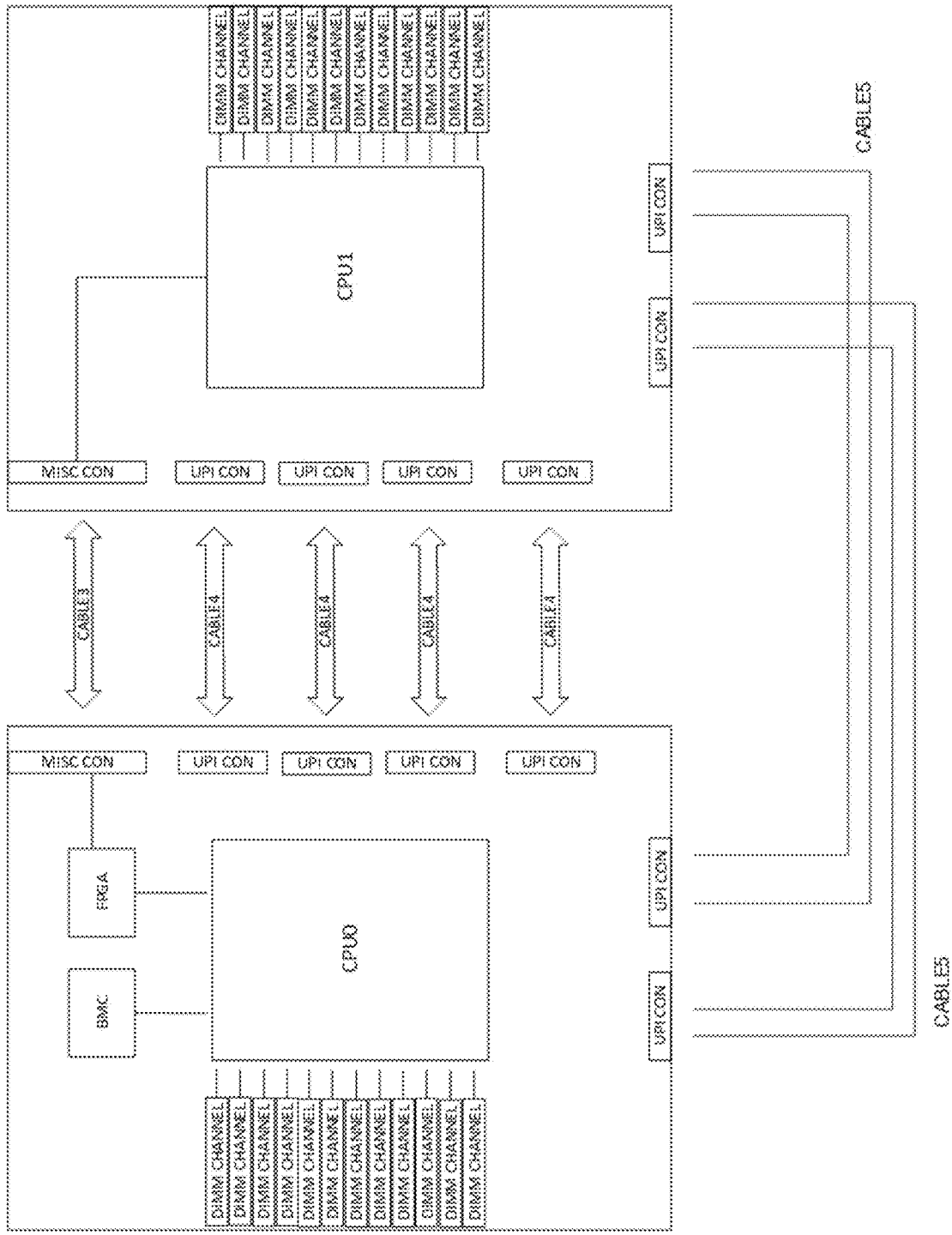
FIG. 8 is a system architecture diagram of another memory system according to an embodiment of the present application.

As shown in FIG. 8, it is a system architecture diagram of another memory system according to an embodiment of the present application. Under normal circumstances, the memory resources of the system are sufficient for use, and there is no need for memory optimization and expansion. The UPI CON (High-speed Interconnection Channel Interface) on the first motherboard (MB0) and the second motherboard (MB1) are interconnected through the Cable cables, and two single-processor subsystems form a dual-processor system. Information between CPUs is transmitted through Cable4 (the first connecting cable), and the logical control signal between MB0 and MB1 are transmitted through Cable3 (the second connecting cable).

In one embodiment of the present application, the memory system 701 further includes:
- a miscellaneous signal transmission interface integrated on the first motherboard; and
- a miscellaneous signal transmission interface integrated on the first adapter board;
- wherein the at least one connecting cable is further used to establish a physical link between the miscellaneous signal transmission interface of the first motherboard and the miscellaneous signal transmission interface of the first adapter board; wherein a connection between the miscellaneous signal transmission interface of the first motherboard and the miscellaneous signal transmission interface of the first adapter board is used to transmit a miscellaneous signal.

Specifically, the miscellaneous signal transmission interface may be a Slimline interface.

In one embodiment of the present application, the miscellaneous signal includes a clock signal, and the memory system 701 further includes:
- the chip of the first adapter board, further used to acquire the clock signal.

In one embodiment of the present application, the miscellaneous signal includes a chip enable signal, and the memory system 701 further includes:
  a field programmable logic gate array module integrated on the first motherboard;
  wherein the field programmable logic gate array module of the first motherboard is used to issue the chip enable signal; and
  the chip of the first adapter board is further used to start working after acquiring the chip enable signal, and convert the processor internal dedicated bus signal into the double data rate memory signal.

In one embodiment of the present application, the miscellaneous signal includes a power-on completion signal, and the memory system 701 further includes:
  the memory module of the first adapter board, used to issue a power-on completion signal after power-on is completed, and transmit the power-on completion signal to the field programmable logic gate array module of the first motherboard, and further used to perform in-situ detection after acquiring the double data rate memory signal, and generate a corresponding detection signal.

In one embodiment of the present application, the miscellaneous signal includes a detection signal, and the memory system 701 further includes:
  a baseboard management controller module integrated on the first motherboard;
  wherein the baseboard management controller module of the first motherboard is used to acquire the detection signal, determine a system working status based on the detection signal, and initialize the chip of the first adapter board when it is determined that the system working status is normal.

In one embodiment of the present application, the miscellaneous signal includes a reset signal, and the memory system 701 further includes:
  the field programmable logic gate array module of the first motherboard, further used to issue a reset signal when initializing the chip of the first adapter board; and
  the memory module of the first adapter board, further used to provide a corresponding memory resource to the processor of the first motherboard for access and use after acquiring the reset signal.

Figure 9:
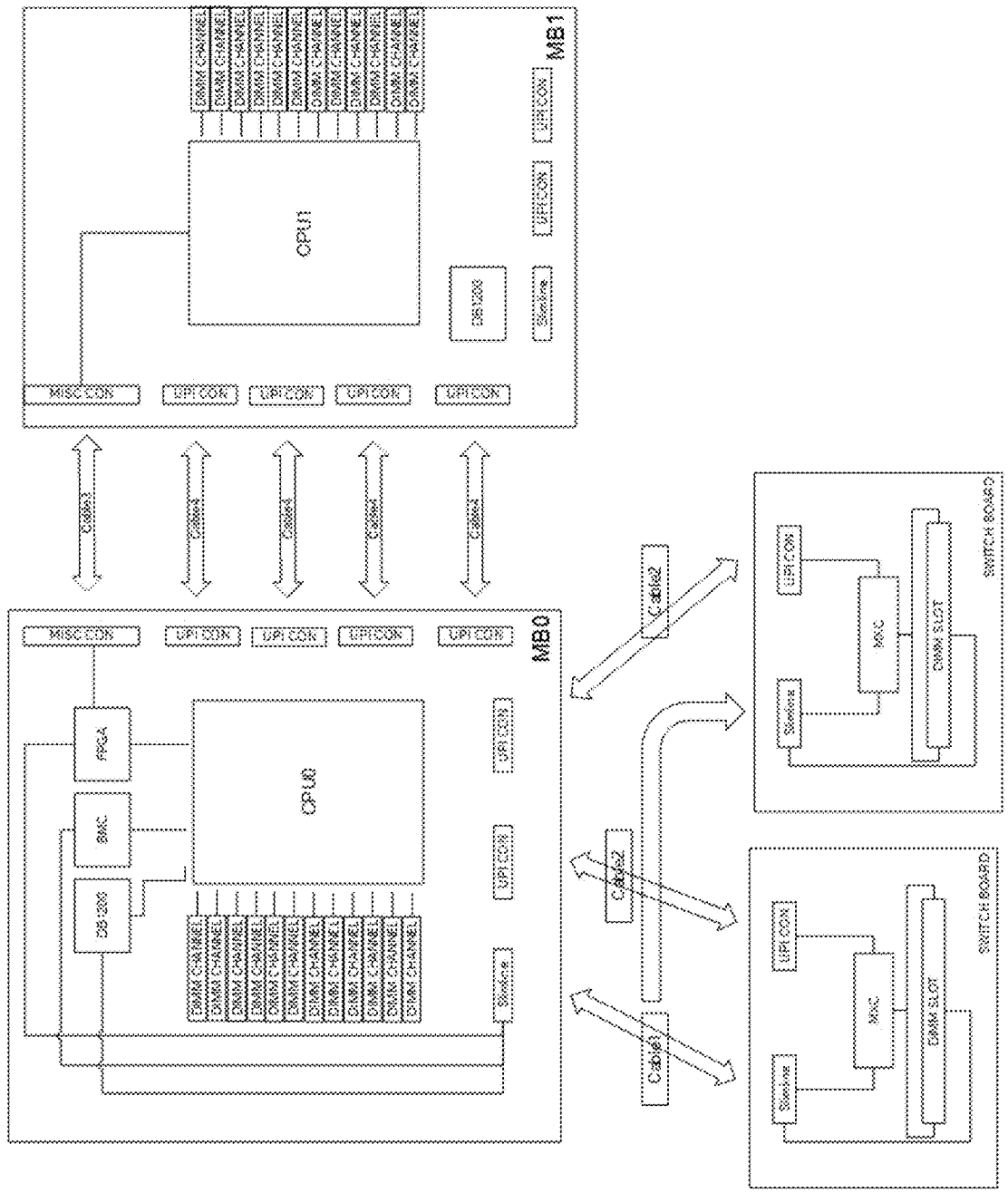
FIG. 9 is a system architecture diagram of yet another memory system according to an embodiment of the present application.

As shown in FIG. 9, it is a system architecture diagram of yet another memory system according to an embodiment of the present application. When the memory resources are initially insufficient, the solution shown in FIG. 9 may be adopted to optimize the system. Cable5 (Cable4 and Cable5 differ in length) that transmits the UPI signals is disconnected, and is connected to the SWITCH BOARD (adapter board) using Cable2, at the same time, the miscellaneous signal on the motherboard is connected to the SWITCH BOARD through Cable1. The signals on UPI CON are transmitted to the MXC chip (CXL DRAM memory controller, belonging to the third device type defined by the CXL protocol) through the on-board wirings, and the miscellaneous signals on the Slimline interface are transmitted to the MXC chip and corresponding memory module.

Among them, the miscellaneous signals include:
  SMB: performing regular data transmission to enable the device to receive monitoring from the BMC.
  PRSNT0: performing in-situ detection to check if the adapter board is in place. When it is not in place, the high and low levels of this signal will be sensed by the field programmable gate array module on the motherboard.
  I3C_SPD: implementing serial in-situ monitoring function for the DIMM strips and performing communication.
  100M_CLKDP\DN: providing clock signals to the MXC chip.
  PWR_BREAK: connecting to the MXC and monitoring whether the voltage of the MXC is abnormal, and when the voltage is abnormal, directly triggering the protection of the MXC and the DDR DIMM.
  RST: performing RESET on the MXC.
  FPGA_RESET: performing RESET on the DIMM.
  MXC_EN: an enable signal enabling the MXC chip to work.
  PWRGD: a signal that informs the FPGA that the DDR DIMM power-on is completed.

Figure 10:
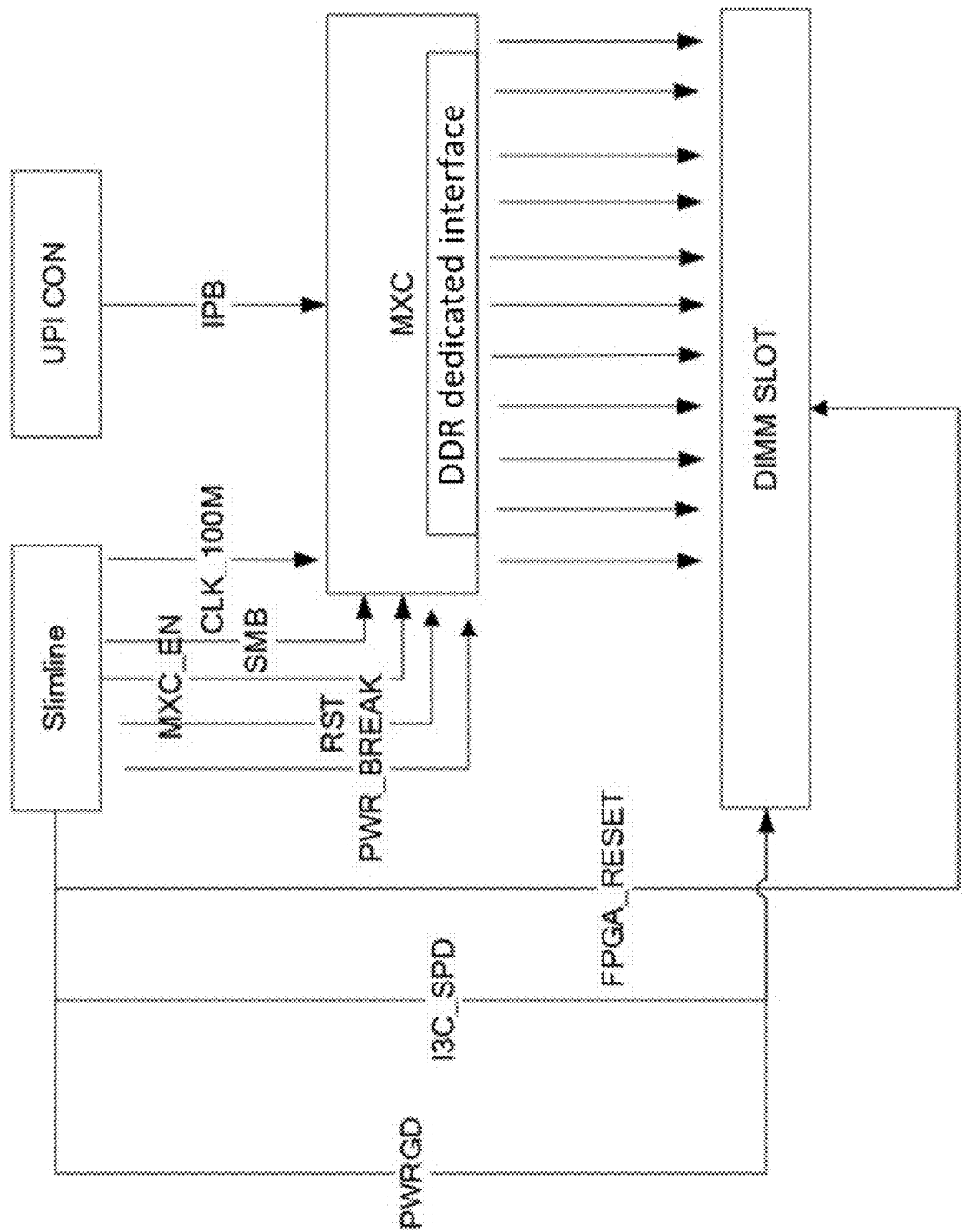
FIG. 10 is a schematic diagram of signal transmission in a memory system according to an embodiment of the present application.

As shown in FIG. 10, it is a schematic diagram of signal transmission in an embodiment of the present application. When the system is working normally, CLK_100M (clock signal) is first sent to the MXC chip, and the IPB signal transmitted based on the PCIE physical link and converted from the UPI signal is sent to the MXC. At this time, it requires the FPGA to send MXC_EN (chip enable signal) to enable the MXC chip to start working. After the communication between the SMB and the motherboard is completed, the MXC is initialized. At the same time, the DIMM SLOT (memory module) is powered on, and a PWRGD (power-on completion signal) is sent to the FPGA after power-on is completed. The IPB signal transmitted based on the PCIE physical link will be converted through the MXC chip, and DDR signals that comply with the DDR5 standard protocol is output from the dedicated interface on the MXC chip. The DIMM SLOT obtains these signals and performs the in-situ detection through I3C_SPD, informing the detection signal to the BMC. Based on the detection signal, the BMC initializes the resources converted from the MXC after determining that the system working status is normal. The FPGA sends a FPGA_REET (reset signal) to the DIMM SLOT, and at this time, the system begins to work officially. The memory resources on the DIMM may be directly accessed by the CPU, and the memory resources are the same as the memory resources on the DIMM directly connected to the CPU. This increases the DRAM capacity of the system, optimizes the ratio to the kernel of the system, and improves the ability to process storage and computing resources.

In one embodiment of the present application, the memory system 701 further includes:
  a second adapter board, and a high-speed interconnection channel interface, a miscellaneous signal transmission interface, a chip and a memory module that are integrated on the second adapter board;
  wherein the at least one connecting cable is further used to establish a physical link between the high-speed interconnection channel interface of the second motherboard and the high-speed interconnection channel interface of the second adapter board, and establish a physical link between the miscellaneous signal transmission interface of the second motherboard and the miscellaneous signal transmission interface of the second adapter board, to establish a communication connection between the second motherboard and the second adapter board; wherein a connection between the high-speed interconnection channel interface of the second motherboard and the high-speed interconnection channel interface of the second adapter board is used to transmit the high-speed channel interconnection signal;

the at least one connecting cable is further used to convert the high-speed channel interconnection signal into a processor internal dedicated bus signal transmitted by the physical link based on the peripheral component interconnect express; and the chip of the second adapter board is used to acquire the converted processor internal dedicated bus signal, and convert the processor internal dedicated bus signal into the double data rate memory signal, to enable a memory resource of the memory module of the second adapter board to be accessed and used by the processor of the second motherboard.

Figure 11:
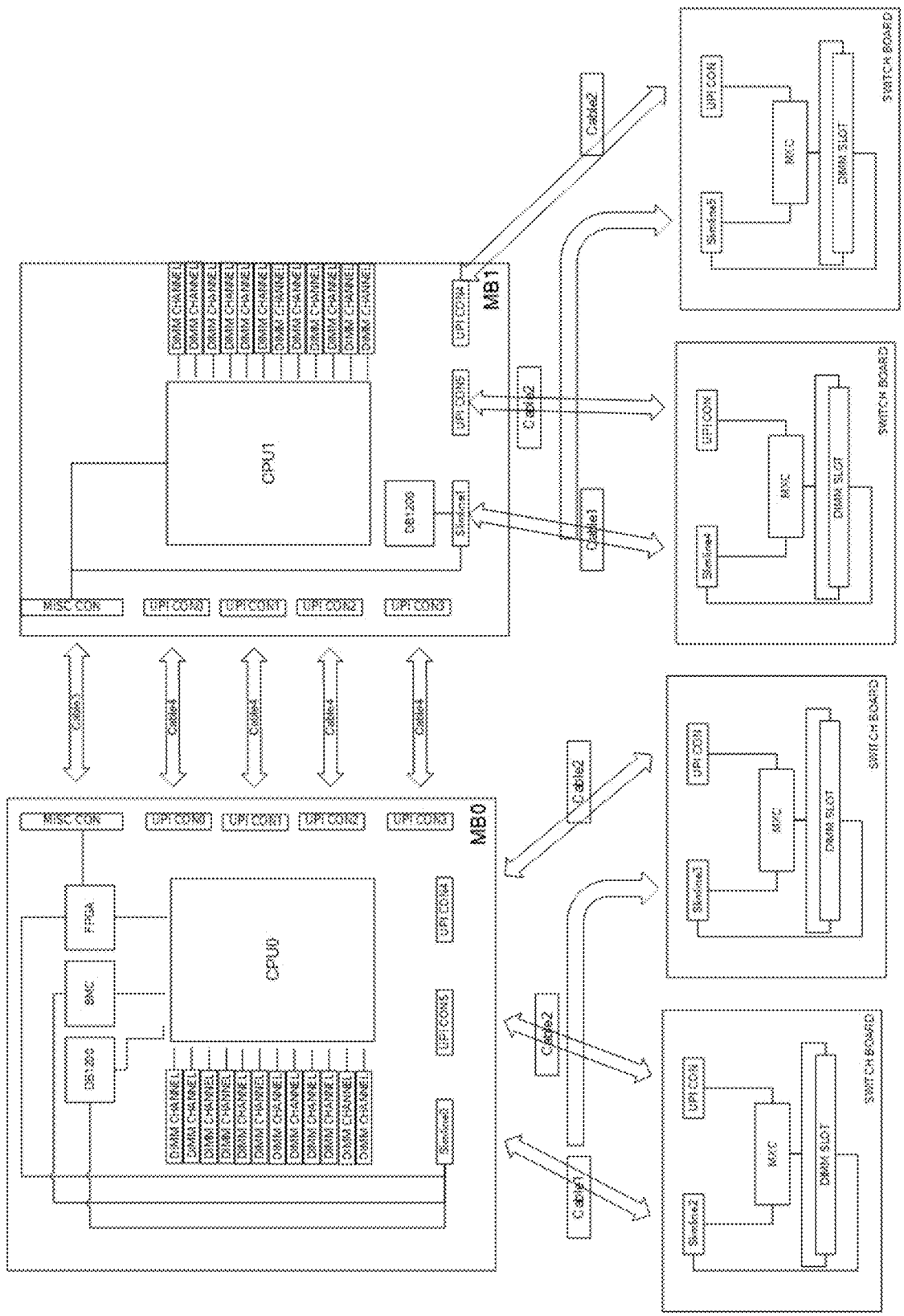
FIG. 11 is a system architecture diagram of still another memory system according to an embodiment of the present application.

As shown in FIG. 11, it is a system architecture diagram of still another memory system according to an embodiment of the present application. When the memory resources of the system are further insufficient, the solution shown in FIG. 11 may be adopted to optimize the system. It may convert the UPI of CPU0 on MB0, as well as the UPI of CPU1 on MB1. Among them, the relevant logic control signals need to be transmitted to the FPGA of the MB0 through MISC CON (Miscellaneous connector) and Cable3. This increases the DRAM capacity of the system and improves its ability to process the storage and computing resources.

In addition, according to the design principle of the dual-processor server basic system, only one UPI needs to be maintained for connection, and the server system may work normally. Therefore, all UPI CON1-5 may be disconnected and connected to the SWITCH BOARD for conversion. This increases the DRAM capacity of the system and greatly improves its ability to process the storage and computing resources.

In one embodiment of the present application, the first motherboard is communicatively connected to a plurality of first adapter boards; the second motherboard is communicatively connected to a plurality of second adapter boards.

In one embodiment of the present application, the memory module of the first adapter board is a first memory module or a second memory module; the memory module of the second adapter board is the first memory module or the second memory module.

Specifically, the first memory module may be a 1DPC memory module, and the second memory module may be a 2DPC memory module.

Figure 12:
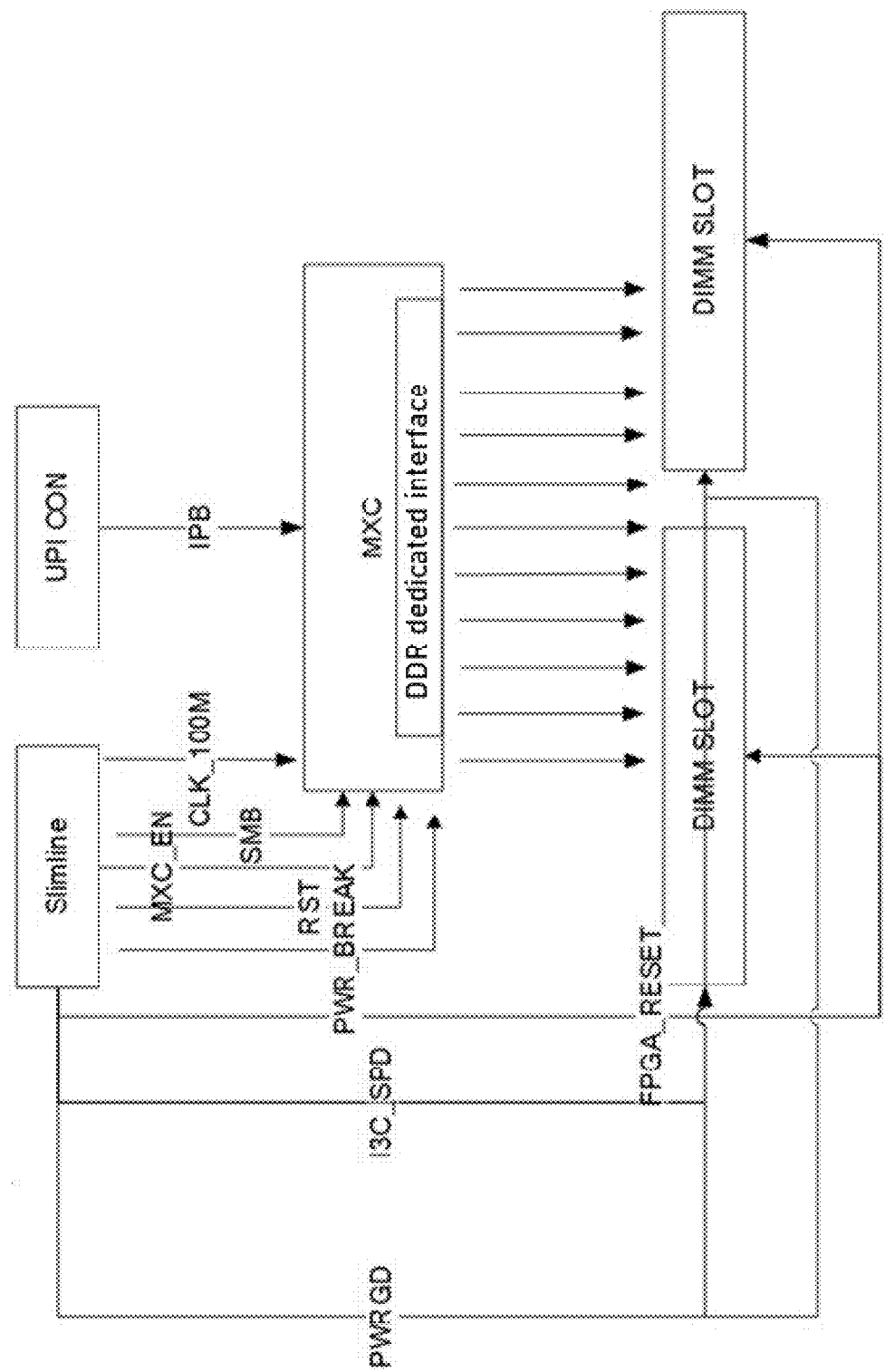
FIG. 12 is a schematic diagram of an adapter board designed as a 2DPC according to an embodiment of the present application.

In one embodiment of the present application, when the memory resources are still insufficient, the memory resources on the adapter board may be designed as a 2DPC. As shown in FIG. 12, it is a schematic diagram of the adapter board designed as a 2DPC according to an embodiment of the present application. According to the current design, the bandwidth of the channel of CXL x8 is approximately the bandwidth of the DDR5 memory channel. The adapter board may be optimized, and the design of two DIMM SLOTS may be completely identical, using the same set of links.

When the system is working normally, CLK_100M is first sent to the MXC chip, and the IPB signal transmitted based on the PCIE physical link and converted from the UPI signal is sent to the MXC. At this time, it requires the FPGA to send MXC_EN (chip enable signal) to enable the MXC chip to start working. After the communication between the SMB and the motherboard is completed, the MXC is initialized. At the same time, the two DIMM SLOTS is simultaneously powered on, and a PWRGD (power-on completion signal) is sent to the FPGA after power-on is completed (if only one DIMM SLOT emits PWRGD, the FPGA will not be able to obtain the high level of the PWRGD based on the line and relationship). The IPB signal transmitted based on the PCIE physical link will be converted through the MXC chip, and DDR signals that comply with the DDR5 standard protocol is output from the dedicated interface on the MXC chip. The DIMM SLOT obtains these signals and performs the in-situ detection through I3C_SPD, informing the detection signal to the BMC. Based on the detection signal, the BMC initializes the resources converted from the MXC after determining that the system working status is normal. The FPGA sends a FPGA_REET to the two DIMM SLOTS, and at this time, the system begins to work officially. The memory resources on the two DIMM may be directly accessed by the CPU, and the memory resources are the same as the memory resources on the DIMM directly connected to the CPU. This increases the DRAM capacity of the system, optimizes the ratio to the kernel of the system, and improves the ability to process storage and computing resources.

In summary, in the embodiment of the present application, separating the dual-processor servers through Cable may make IPB resources no longer dedicated. Through another Cable, dedicated IPB resources may be converted into the IPB resources transmitted based on the PCIE physical link. Combined with the CXL cache consistency protocol, this resource may be converted into the DIMM resources, expanding the memory pool capacity of the entire system. In addition, it not only solves the problem of low efficiency in IPB usage, but also uses external boards to enrich the memory resources and solve the design difficulties of on-board 2DPC or 3DPC layout wiring. The present application may increase the DRAM capacity of the memory system, optimize the ratio to the kernel of the system, improve the ability to process the storage and computing resources, increase memory density on a single system, and reduce the cost of the memory resources per unit system. The present application combines the advantages of 1DPC and 2DPC for design, the adapter board design of 1DPC is used when high transmission rates are required, and the adapter board design of 2DPC is used when larger DRAM memory space is needed.

The present application may effectively solve the problem that the memory pool of the server system is too small and the ratio of the DRAM to CORE is too low; the problem of low utilization of IPB dedicated resources when the system interaction frequency is low; solving the spatial difficulty of adding DIMMs to server system motherboards; the problem of low DIMM transmission rate in the case of large memory pool capacity, and the problem of high memory transmission rate and low system memory capacity.

Figure 13:
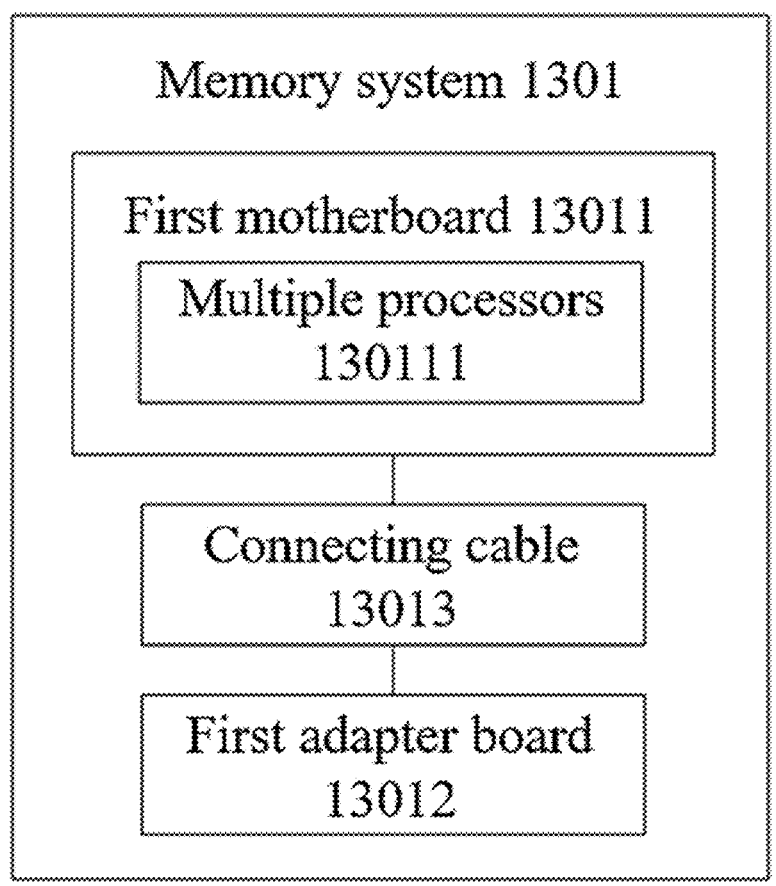
FIG. 13 is a structural block diagram of yet another memory system according to an embodiment of the present application.

Referring to FIG. 13, it shows a structural block diagram of yet another memory system according to an embodiment of the present application. The memory system 1301 includes:

a first motherboard 13011, and a processor and a high-speed interconnection channel interface that are integrated on the first motherboard 13011;

a first adapter board 13012, and a high-speed interconnection channel interface, a chip and a memory module that are integrated on the first adapter board 13012; and at least one connecting cable 13013;

wherein the at least one connecting cable 13013 is used to establish a physical link between the high-speed interconnection channel interface of the first motherboard 13011 and the high-speed interconnection channel interface of the first adapter board 13012, to establish a communication connection between the first motherboard 13011 and the first adapter board 13012; wherein a connection between the high-speed interconnection channel interface of the first motherboard 13011 and the high-speed interconnection channel interface of the first adapter board 13012 is used to transmit a high-speed channel interconnection signal;

the at least one connecting cable 13013 is further used to convert the high-speed channel interconnection signal into a processor internal dedicated bus signal transmitted by a physical link based on a peripheral component interconnect express; and the chip of the first adapter board 13012 is used to acquire the converted processor internal dedicated bus signal, and convert the processor internal dedicated bus signal into a double data rate memory signal, to enable a memory resource of the memory module of the first adapter board 13012 to be accessed and used by the processor of the first motherboard 13011;

among them, the first motherboard 13011 is integrated with a plurality of processors 130111, and the plurality of processors 130111 are interconnected to transfer the processor internal dedicated bus signal between each other, and the first motherboard 13011 is communicatively connected to a plurality of first adapter boards 13012, and the memory system further includes:

the plurality of processors 130111 of the first motherboard 13011, used to invoke memory resources of memory modules of the plurality of first adapter boards 13012.

Figure 14:
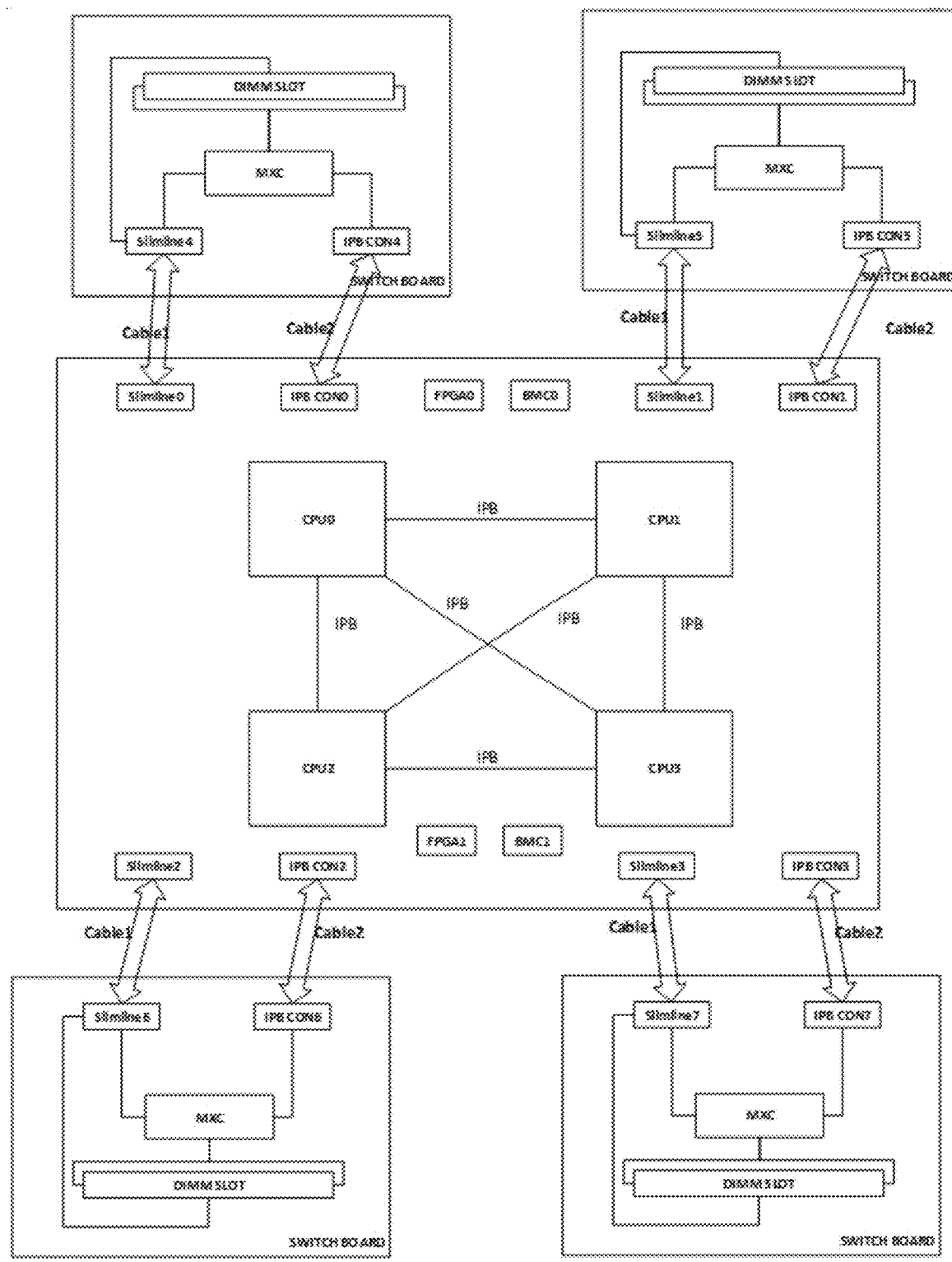
FIG. 14 is a system architecture diagram of a memory system having a first motherboard integrated with four processors according to an embodiment of the present application.

Specifically, the first motherboard may integrate four or eight processors, referring to FIG. 14, it is a system architecture diagram of a memory system having a first motherboard integrated with four processors according to an embodiment of the present application. Any two processors are interconnected to transmit the processor internal dedicated bus signal. The memory system includes four first adapter boards. When the cables are correctly connected, the memory resources of the memory module of any first adapter board may be invoked by any processor on the first motherboard. For example, CPU0 may invoke the memory resources of any first adapter board.

Figure 15:
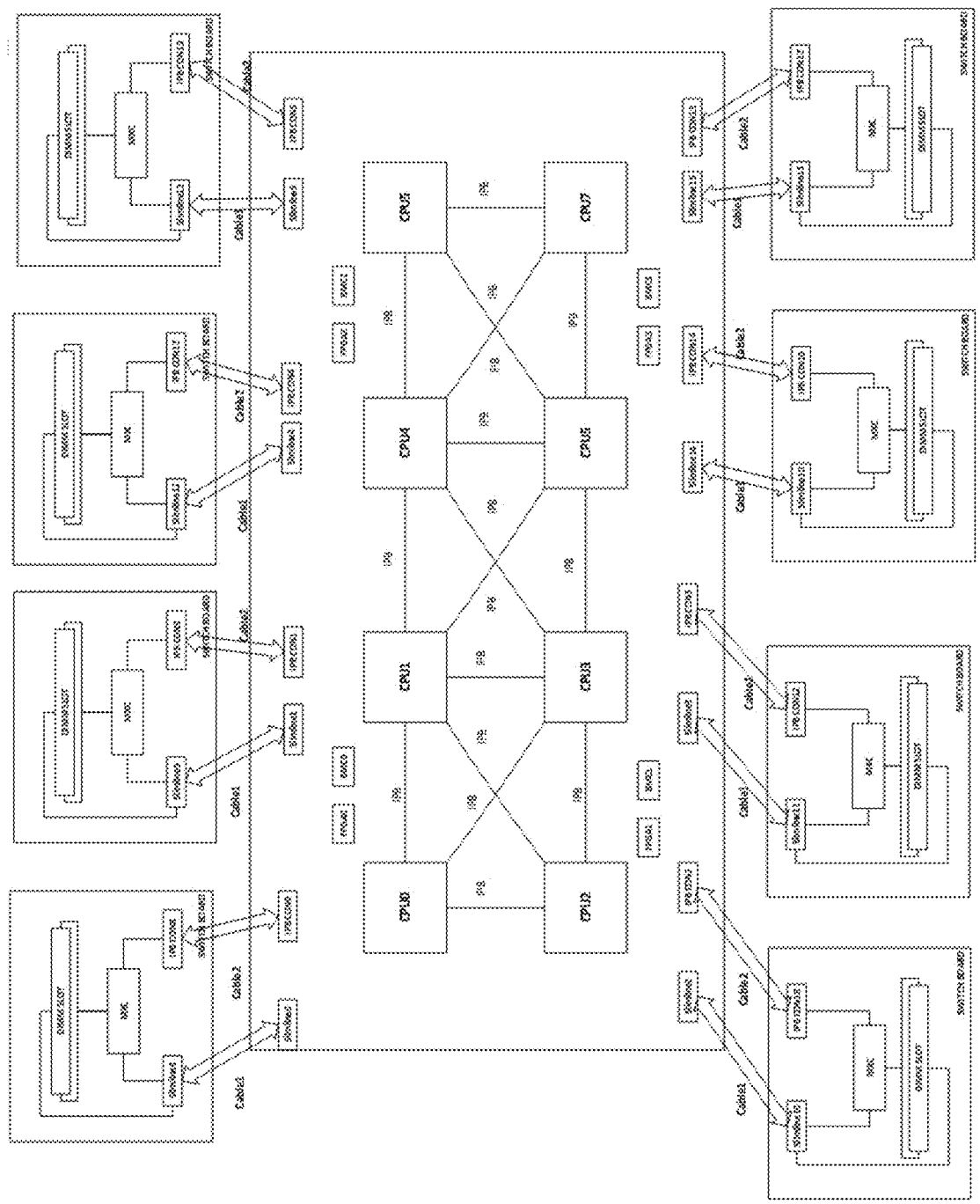
FIG. 15 is a system architecture diagram of a memory system having a first motherboard integrated with eight processors according to an embodiment of the present application.

Referring to FIG. 15, it is a system architecture diagram of a memory system having a first motherboard integrated with eight processors according to an embodiment of the present application. The various processors on the first motherboard are interconnected to transmit the processor internal dedicated bus signal, and they may invoke the memory resources of any first adapter board.

In the embodiment of the present application, when the server is a multi-processor server, the technical solution of the embodiment of the present application will be implemented according to different server hardware architectures, which is mainly determined by the IPB interconnection topology structure of multiple CPUs. There are a plurality of groups of IPB resources for CPUs, for example, one type of CPU has 4 groups of IPB buses, while another type of CPU has 6 groups of IPB buses, different hardware connection solutions may be designed according to different topology structures to expand the memory resources of the memory system.

When the server is a multi-processor server, the technical solutions of the above embodiments may be combined to maximize the capacity of the memory pool.

In summary, in the embodiments of the present application, the memory system includes a first motherboard, and a processor and a high-speed interconnection channel interface that are integrated on the first motherboard; as well as a first adapter board, and a high-speed interconnection channel interface, a chip and a memory module that are integrated on the first adapter board. The connecting cable may establish a communication connection between the first motherboard and the first adapter board, and the connecting cable may convert the high-speed channel interconnect signal into a processor internal dedicated bus signal transmitted by a physical link based on a peripheral component interconnect express. Then, the chip of the first adapter board may convert the processor internal dedicated bus signal into a double data rate memory signal, to enable a memory resource of the memory module of the first adapter board to be accessed and used by the processor of the first motherboard. By adopting the above design, the high-speed channel interconnection signal is converted into the IPB resource that may be transmitted over the PCIE physical link by the connecting cable, and the IPB resources are converted into the DIMM memory resources that comply with JEDEC protocol standards through chips that support the CXL protocol. Using the external boards to expand DRAM resources, so that the DIMM resources are not on the same motherboard as the CPU, which may optimize the spatial layout resources of the motherboard.

Referring to FIG. 16, it is a flow chart of steps of a method for adjusting memory resources according to an embodiment of the present application, which is applied to the memory system, the memory system includes the first motherboard, the first adapter board, a second motherboard and a second adapter board, and the method may include the following steps:

Step 1601, determining current load information of the memory system, and determining a target memory resource that needs to be provided according to the current load information.

Step 1602, based on the target memory resource, determining whether to control the first motherboard and the first adapter board to connect, and/or, determining whether to control the second motherboard and the second adapter board to connect, and/or, determining a quantity of first adapter boards connected to the first motherboard, and/or, determining a quantity of second adapter boards connected to the second motherboard.

In the embodiment of the present application, the current load information of the memory system may be determined, and the target memory resources that the memory system needs to provide may be determined based on the load information. Among them, the load information may refer to the size information of the memory space occupied by programs running in the system; and the target memory resources are used to maintain the processing, storage, and computing capabilities of the memory system at a high level.

In one embodiment of the present application, the step of, based on the target memory resource, determining whether to control the first motherboard and the first adapter board to connect, and/or, determining whether to control the second motherboard and the second adapter board to connect, and/or, determining a quantity of first adapter boards connected to the first motherboard, and/or, determining a quantity of second adapter boards connected to the second motherboard, may include the following sub-steps:

in response to the target memory resource not exceeding memory resources provided by the first motherboard and the second motherboard, controlling the first motherboard and the first adapter board not to connect, and controlling the second motherboard and the second adapter board not to connect, so that only the first motherboard and the second motherboard are responsible for providing the memory resources.

In response to the target memory resource exceeding memory resources provided by the first motherboard and the second motherboard, and not exceeding a preset first memory resource usage threshold, controlling the first motherboard and the first adapter board to connect, and controlling the second motherboard and the second adapter board not to connect, so that the first motherboard, the second motherboard, and at least one first adapter board are responsible for providing the memory resources.

In response to the target memory resource exceeding a preset first memory resource usage threshold, and not exceeding a preset second memory resource usage threshold, controlling the first motherboard and the first adapter board to connect, and controlling the second motherboard and the second adapter board to connect, so that the first motherboard, the second motherboard, at least one first adapter board and at least one second adapter board are responsible for providing the memory resources.

In one embodiment of the present application, the method may further include the following step:
  in response to the target memory resource exceeding a preset second memory resource usage threshold, configuring the memory module of the first adapter board and/or a memory module of the second adapter board as a second memory module.

In the embodiment of the present application, as more and more target memory resources need to be provided, the steps of establishing the connection between the first motherboard and the first adapter board, establishing the connection between the second motherboard and the second adapter board, increasing the quantity of first adapter boards connected to the first motherboard, increasing the quantity of second adapter boards connected to the second motherboard, and configuring the memory modules of the first adapter board and/or the second adapter board as 2DPC memory modules may be gradually carried out.

In summary, in the embodiment of the present application, separating the dual-processor servers through Cable may make IPB resources no longer dedicated. Through another Cable, dedicated IPB resources may be converted into the IPB resources transmitted based on the PCIE physical link. Combined with the CXL cache consistency protocol, this resource may be converted into the DIMM resources, expanding the memory pool capacity of the entire system. In addition, it not only solves the problem of low efficiency in IPB usage, but also uses external boards to enrich the memory resources and solve the design difficulties of on-board 2DPC or 3DPC layout wiring. The present application may increase the DRAM capacity of the memory system, optimize the ratio to the kernel of the system, improve the ability to process the storage and computing resources, increase memory density on a single system, and reduce the cost of the memory resources per unit system. The present application combines the advantages of 1DPC and 2DPC for design, the adapter board design of 1DPC is used when high transmission rates are required, and the adapter board design of 2DPC is used when larger DRAM memory space is needed.

It should be noted that for the sake of simplicity, the method embodiments are described as a series of action combinations. However, those skilled in the art should be aware that the embodiments of the present application are not limited by the order of the actions described, as some steps may be performed in other orders or simultaneously according to some embodiments of the present application. Secondly, persons skilled in the art should also be aware that the embodiments described in the specification belong to the embodiments of the present application, and the actions involved are not necessarily necessary for the embodiments of the present application.

Referring to FIG. 17, it shows a structural block diagram of an apparatus for adjusting memory resources according to an embodiment of the present application, applied to the memory system, the memory system includes the first motherboard, the first adapter board, a second motherboard and a second adapter board, and the apparatus may include the following modules:
  a first determination module 1701 configured for determining current load information of the memory system, and determining a target memory resource that needs to be provided according to the current load information; and
  a second determination module 1702 configured for, based on the target memory resource, determining whether to control the first motherboard and the first adapter board to connect, and/or, determining whether to control the second motherboard and the second adapter board to connect, and/or, determining a quantity of first adapter boards connected to the first motherboard, and/or, determining a quantity of second adapter boards connected to the second motherboard.

In some embodiments, the second determination module includes:
  a first control submodule configured for, in response to the target memory resource not exceeding memory resources provided by the first motherboard and the second motherboard, controlling the first motherboard and the first adapter board not to connect, and controlling the second motherboard and the second adapter board not to connect, so that only the first motherboard and the second motherboard are responsible for providing the memory resources.

In some embodiments, the second determination module includes:
  a second control submodule configured for, in response to the target memory resource exceeding memory resources provided by the first motherboard and the second motherboard, and not exceeding a preset first memory resource usage threshold, controlling the first motherboard and the first adapter board to connect, and controlling the second motherboard and the second adapter board not to connect, so that the first motherboard, the second motherboard, and at least one first adapter board are responsible for providing the memory resources.

In some embodiments, the second determination module includes:
  a third control submodule configured for, in response to the target memory resource exceeding a preset first memory resource usage threshold, and not exceeding a preset second memory resource usage threshold, controlling the first motherboard and the first adapter board to connect, and controlling the second motherboard and the second adapter board to connect, so that the first motherboard, the second motherboard, at least one first adapter board and at least one second adapter board are responsible for providing the memory resources.

In some embodiments, the apparatus further includes:
  a configuration module configured for, in response to the target memory resource exceeding a preset second memory resource usage threshold, configuring the memory module of the first adapter board and/or a memory module of the second adapter board as a second memory module.

In summary, in the embodiment of the present application, separating the dual-processor servers through Cable may make IPB resources no longer dedicated. Through another Cable, dedicated IPB resources may be converted into the IPB resources transmitted based on the PCIE physical link. Combined with the CXL cache consistency protocol, this resource may be converted into the DIMM resources, expanding the memory pool capacity of the entire system. In addition, it not only solves the problem of low efficiency in IPB usage, but also uses external boards to enrich the memory resources and solve the design difficulties of on-board 2DPC or 3DPC layout wiring. The present application may increase the DRAM capacity of the memory system, optimize the ratio to the kernel of the system, improve the ability to process the storage and computing resources, increase memory density on a single system, and reduce the cost of the memory resources per unit system. The present application combines the advantages of 1DPC and 2DPC for design, the adapter board design of 1DPC is used when high transmission rates are required, and the adapter board design of 2DPC is used when larger DRAM memory space is needed.

For the device embodiments, due to its basic similarity with the method embodiments, the description is relatively simple. For relevant information, please refer to the partial explanation of the method embodiments.

The embodiment of the present application also provides an electronic device, as shown in FIG. 18, including a processor 1801, a storage 1802, and a computer program stored on the storage and capable of running on the processor. When the computer program is executed by the processor, it implements the various processes of the method for adjusting memory resources described above and may achieve the same technical effect. To avoid repetition, it will not be repeated here.

The embodiment of the present application also provides a non-transitory computer-readable storage medium, as shown in FIG. 19. A computer program 1901 is stored on the non-transitory computer-readable storage medium. When the computer program is executed by the processor, it implements the various processes of the method for adjusting memory resources described above, and the same technical effect may be achieved. To avoid repetition, it will not be repeated here.

The various embodiments in this specification are described in a progressive manner, with each embodiment emphasizing its differences from other embodiments. The same and similar parts between the embodiments may be referred to each other.

Persons skilled in the art should understand that the embodiments of the present application may be provided as methods, devices, or computer program products. Therefore, the embodiments of the present application may take the form of fully hardware embodiments, fully software embodiments, or embodiments combining software and hardware aspects. Moreover, the embodiments of the present application may take the form of a computer program product implemented on one or more computer usable storage media (including but not limited to disk storage, CD-ROM, optical storage, etc.) containing computer usable program code.

The embodiments of the present application are described with reference to the flow chart and/or block diagram of the method, terminal device (system), and computer program product according to the embodiments of the present application. It should be understood that each process and/or block in the flow chart and/or block diagram, as well as the combination of processes and/or blocks in the flow chart and/or block diagram, may be implemented by computer program instructions. These computer program instructions may be provided to a processor of a general-purpose computer, specialized computer, embedded processor, or other programmable data processing terminal device to generate a machine, such that the instructions executed by the processor of the computer or other programmable data processing terminal device generate a device for implementing the functions specified in one or more processes in the flow chart and/or one or more boxes in the block diagram.

These computer program instructions may also be stored in computer-readable storage that may guide a computer or other programmable data processing terminal device to operate in a specific manner, such that the instructions stored in the computer-readable storage generate a manufactured product including instruction devices that implement the functions specified in a flow chart or multiple flow charts and/or a block diagram or multiple boxes.

These computer program instructions may also be loaded onto a computer or other programmable data processing terminal device, enabling a series of operational steps to be executed on the computer or other programmable terminal device to generate computer implemented processing. The instructions executed on the computer or other programmable terminal device provide steps for implementing the functions specified in one or more processes in the flow chart and/or one or more boxes in the block diagram.

Although some embodiments of the present application have been described, those skilled in the art may make additional changes and modifications to these embodiments once they have knowledge of the basic inventive concept. Therefore, the attached claims are intended to be interpreted as including the embodiments of the present application and all changes and modifications falling within the scope of the embodiments of the present application.

Finally, it should be noted that in this specification, relational terms such as first and second are only used to distinguish one entity or operation from another, and do not necessarily require or imply any actual relationship or order between these entities or operations. Moreover, the terms "including/comprising", "containing", or any other variation thereof are intended to encompass non-exclusive inclusion, such that a process, method, article, or terminal device that includes a series of elements not only includes those elements, but also includes other elements not explicitly listed, or also includes elements inherent to such process, method, article, or terminal device. Without further limitations, the element limited by the statement "including one . . . " does not exclude the existence of other identical elements in the process, method, item, or terminal device that includes the element.

The above provides a detailed introduction to a memory system, a method for adjusting memory resources, an apparatus for adjusting memory resources, an electronic device, and a non-transitory computer-readable storage medium provided in the present application. This specification applies specific examples to explain the principles and implementation methods of the present application. The above embodiments are only used to help understand the method and core idea of the present application. Meanwhile, for persons skilled in the art, there may be changes in the specific implementation and application scope based on the ideas of the present application. Therefore, the content of this specification should not be understood as limiting the present application.

The invention claimed is:

1. A memory system, comprising:
a first motherboard, and a processor and a high-speed interconnection channel interface that are integrated on the first motherboard;
a first adapter board, and a high-speed interconnection channel interface, a chip and a memory module that are integrated on the first adapter board; and
at least one connecting cable;
wherein the at least one connecting cable is used to establish a physical link between the high-speed interconnection channel interface of the first motherboard and the high-speed interconnection channel interface of the first adapter board, to establish a communication connection between the first motherboard and the first adapter board; wherein a connection between the high-speed interconnection channel interface of the first motherboard and the high-speed interconnection channel interface of the first adapter board is used to transmit a high-speed channel interconnection signal;
the at least one connecting cable is further used to convert the high-speed channel interconnection signal into a processor internal dedicated bus signal transmitted by a physical link based on a peripheral component interconnect express; and
the chip of the first adapter board is used to acquire the converted processor internal dedicated bus signal, and convert the processor internal dedicated bus signal into a double data rate memory signal, to enable a memory resource of the memory module of the first adapter board to be accessed and used by the processor of the first motherboard, to achieve memory pooling;
the memory system further comprises:
a second motherboard, and a processor and a high-speed interconnection channel interface that are integrated on the second motherboard;
wherein the at least one connecting cable is further used to establish a physical link between the high-speed interconnection channel interface of the first motherboard and the high-speed interconnection channel interface of the second motherboard, to establish a communication connection between the first motherboard and the second motherboard;
the memory system further comprises a second adapter board with a same structure as the first adapter board; the second adapter board is used to be connected to the second motherboard;
wherein a memory resource adjustment apparatus in the memory system is configured to determine current load information of the memory system, and determine a target memory resource that needs to be provided according to the current load information; and
based on the target memory resource, determine whether to control the first motherboard and the first adapter board to connect, and/or, determine whether to control the second motherboard and the second adapter board to connect, and/or, determine a quantity of first adapter boards connected to the first motherboard, and/or, determine a quantity of second adapter boards connected to the second motherboard;
wherein the at least one connecting cable comprises a first connecting cable and a second connecting cable, and the memory system further comprises:
the first connecting cable, used to transmit data between the processor of the first motherboard and the processor of the second motherboard; and
the second connecting cable, used to transmit a logic control signal between the first motherboard and the second motherboard.

2. The memory system according to claim 1, further comprising:
a miscellaneous signal transmission interface integrated on the first motherboard; and
a miscellaneous signal transmission interface integrated on the first adapter board;
wherein the at least one connecting cable is further used to establish a physical link between the miscellaneous signal transmission interface of the first motherboard and the miscellaneous signal transmission interface of the first adapter board; wherein a connection between the miscellaneous signal transmission interface of the first motherboard and the miscellaneous signal transmission interface of the first adapter board is used to transmit a miscellaneous signal.

3. The memory system according to claim 2, wherein the miscellaneous signal comprises a clock signal, and the memory system further comprises:
the chip of the first adapter board, further used to acquire the clock signal.

4. The memory system according to claim 3, wherein the miscellaneous signal comprises a chip enable signal, and the memory system further comprises:
a field programmable logic gate array module integrated on the first motherboard;
wherein the field programmable logic gate array module of the first motherboard is used to issue the chip enable signal; and
the chip of the first adapter board is further used to start working after acquiring the chip enable signal, and convert the processor internal dedicated bus signal into the double data rate memory signal.

5. The memory system according to claim 4, wherein the miscellaneous signal comprises a power-on completion signal, and the memory system further comprises:
the memory module of the first adapter board, used to issue a power-on completion signal after power-on is completed, and transmit the power-on completion signal to the field programmable logic gate array module of the first motherboard, and further used to perform in-situ detection after acquiring the double data rate memory signal, and generate a corresponding detection signal.

6. The memory system according to claim 5, wherein the miscellaneous signal comprises a detection signal, and the memory system further comprises:
a baseboard management controller module integrated on the first motherboard;
wherein the baseboard management controller module of the first motherboard is used to acquire the detection signal, determine a system working status based on the detection signal, and initialize the chip of the first adapter board when it is determined that the system working status is normal.

7. The memory system according to claim 6, wherein the miscellaneous signal comprises a reset signal, and the memory system further comprises:
the field programmable logic gate array module of the first motherboard, further used to issue a reset signal when initializing the chip of the first adapter board; and
the memory module of the first adapter board, further used to provide a corresponding memory resource to the processor of the first motherboard for access and use after acquiring the reset signal.

8. The memory system according to claim 7, further comprising:
- a second adapter board, and a high-speed interconnection channel interface, a miscellaneous signal transmission interface, a chip and a memory module that are integrated on the second adapter board;
- wherein the at least one connecting cable is further used to establish a physical link between the high-speed interconnection channel interface of the second motherboard and the high-speed interconnection channel interface of the second adapter board, and establish a physical link between the miscellaneous signal transmission interface of the second motherboard and the miscellaneous signal transmission interface of the second adapter board, to establish a communication connection between the second motherboard and the second adapter board; wherein a connection between the high-speed interconnection channel interface of the second motherboard and the high-speed interconnection channel interface of the second adapter board is used to transmit the high-speed channel interconnection signal;
- the at least one connecting cable is further used to convert the high-speed channel interconnection signal into the processor internal dedicated bus signal transmitted by the physical link based on the peripheral component interconnect express; and
- the chip of the second adapter board is used to acquire the converted processor internal dedicated bus signal, and convert the processor internal dedicated bus signal into the double data rate memory signal, to enable a memory resource of the memory module of the second adapter board to be accessed and used by the processor of the second motherboard.

9. The memory system according to claim 8, wherein the first motherboard is communicatively connected to a plurality of first adapter boards; the second motherboard is communicatively connected to a plurality of second adapter boards.

10. The memory system according to claim 9, wherein the memory module of the first adapter board is a first memory module or a second memory module; the memory module of the second adapter board is the first memory module or the second memory module.

11. The memory system according to claim 1, wherein the first motherboard is integrated with a plurality of processors, and the plurality of processors are interconnected to transfer the processor internal dedicated bus signal between each other, and the first motherboard is communicatively connected to a plurality of first adapter boards, and the memory system further comprises:
- the plurality of processors of the first motherboard, used to invoke memory resources of memory modules of the plurality of first adapter boards.

12. A method for adjusting memory resources, applied to the memory system according to claim 1, wherein the memory system comprises the first motherboard, the first adapter board, a second motherboard and a second adapter board, and the method comprises:
- determining current load information of the memory system, and determining a target memory resource that needs to be provided according to the current load information; and
- based on the target memory resource, determining whether to control the first motherboard and the first adapter board to connect, and/or, determining whether to control the second motherboard and the second adapter board to connect, and/or, determining a quantity of first adapter boards connected to the first motherboard, and/or, determining a quantity of second adapter boards connected to the second motherboard.

13. The method according to claim 12, wherein the step of, based on the target memory resource, determining whether to control the first motherboard and the first adapter board to connect, and/or, determining whether to control the second motherboard and the second adapter board to connect, and/or, determining a quantity of first adapter boards connected to the first motherboard, and/or, determining a quantity of second adapter boards connected to the second motherboard, comprises:
- in response to the target memory resource not exceeding memory resources provided by the first motherboard and the second motherboard, controlling the first motherboard and the first adapter board not to connect, and controlling the second motherboard and the second adapter board not to connect, so that only the first motherboard and the second motherboard are responsible for providing the memory resources.

14. The method according to claim 12, wherein the step of, based on the target memory resource, determining whether to control the first motherboard and the first adapter board to connect, and/or, determining whether to control the second motherboard and the second adapter board to connect, and/or, determining a quantity of first adapter boards connected to the first motherboard, and/or, determining a quantity of second adapter boards connected to the second motherboard, comprises:
- in response to the target memory resource exceeding memory resources provided by the first motherboard and the second motherboard, and not exceeding a preset first memory resource usage threshold, controlling the first motherboard and the first adapter board to connect, and controlling the second motherboard and the second adapter board not to connect, so that the first motherboard, the second motherboard, and at least one first adapter board are responsible for providing the memory resources.

15. The method according to claim 12, wherein the step of, based on the target memory resource, determining whether to control the first motherboard and the first adapter board to connect, and/or, determining whether to control the second motherboard and the second adapter board to connect, and/or, determining a quantity of first adapter boards connected to the first motherboard, and/or, determining a quantity of second adapter boards connected to the second motherboard, comprises:
- in response to the target memory resource exceeding a preset first memory resource usage threshold, and not exceeding a preset second memory resource usage threshold, controlling the first motherboard and the first adapter board to connect, and controlling the second motherboard and the second adapter board to connect, so that the first motherboard, the second motherboard, at least one first adapter board and at least one second adapter board are responsible for providing the memory resources.

16. The method according to claim 12, wherein the method further comprises:
- in response to the target memory resource exceeding a preset second memory resource usage threshold, configuring the memory module of the first adapter board and/or a memory module of the second adapter board as a second memory module.

17. An electronic device, comprising: a processor, a storage and a computer program stored on the storage and capable of running on the processor, wherein the computer program, when executed by the processor, implements steps of the method for adjusting the memory resources according to claim 12.

18. A non-transitory computer-readable storage medium, wherein a computer program is stored on the non-transitory computer-readable storage medium, and the computer program, when executed by a processor, implements steps of the method for adjusting the memory resources according to claim 12.

19. The memory system according to claim 2, wherein the miscellaneous signal transmission interface is a Slimline interface.

* * * * *